United States Patent
Pachler et al.

(10) Patent No.: US 10,235,543 B2
(45) Date of Patent: Mar. 19, 2019

(54) BOOSTER ANTENNA STRUCTURE FOR A CHIP CARD

(71) Applicant: Infineon Technologies AG, Neubiberg (DE)

(72) Inventors: Walther Pachler, Graz (AT); Stephan Rampetzreiter, Graz (AT); Harald Witschnig, Villach (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/983,684

(22) Filed: Dec. 30, 2015

(65) Prior Publication Data

US 2016/0188926 A1 Jun. 30, 2016

Related U.S. Application Data

(63) Continuation-in-part of application No. 13/713,123, filed on Dec. 13, 2012, now Pat. No. 9,275,324.

(30) Foreign Application Priority Data

Dec. 13, 2011 (DE) ........................ 10 2011 056 323

(51) Int. Cl.
G06K 7/10 (2006.01)
G06K 19/077 (2006.01)
H01Q 7/00 (2006.01)
H01Q 1/22 (2006.01)

(52) U.S. Cl.
CPC ... G06K 7/10336 (2013.01); G06K 19/07794 (2013.01); H01Q 7/00 (2013.01); H01Q 1/2225 (2013.01)

(58) Field of Classification Search
USPC ........................................................ 235/492
See application file for complete search history.

(56) References Cited

U.S. PATENT DOCUMENTS

| | | | |
|---|---|---|---|
| 6,285,342 B1 * | 9/2001 | Brady ............. | G06K 19/07749 235/491 |
| 2007/0229281 A1 * | 10/2007 | Shionoiri ......... | G06K 19/06037 340/572.7 |
| 2008/0283615 A1 * | 11/2008 | Finn .................... | G06K 19/077 235/488 |
| 2009/0033467 A1 * | 2/2009 | Finocchiaro ............ | H04B 5/00 340/10.1 |
| 2013/0146671 A1 | 6/2013 | Grieshofer et al. | |
| 2014/0158775 A1 | 6/2014 | Hofer et al. | |

FOREIGN PATENT DOCUMENTS

DE 102011056323 A1 6/2013

* cited by examiner

*Primary Examiner* — Michael G Lee
*Assistant Examiner* — David Tardif
(74) *Attorney, Agent, or Firm* — Viering, Jentschura & Partner mbB

(57) ABSTRACT

A booster antenna structure for a chip card. The booster antenna structure includes a first electrical circuit, which forms a first resonant circuit, a second electrical circuit which forms a second resonant circuit, and a parallel coupling between the first electrical circuit and the second electrical circuit. The booster antenna structure is formed of a single wire.

19 Claims, 14 Drawing Sheets

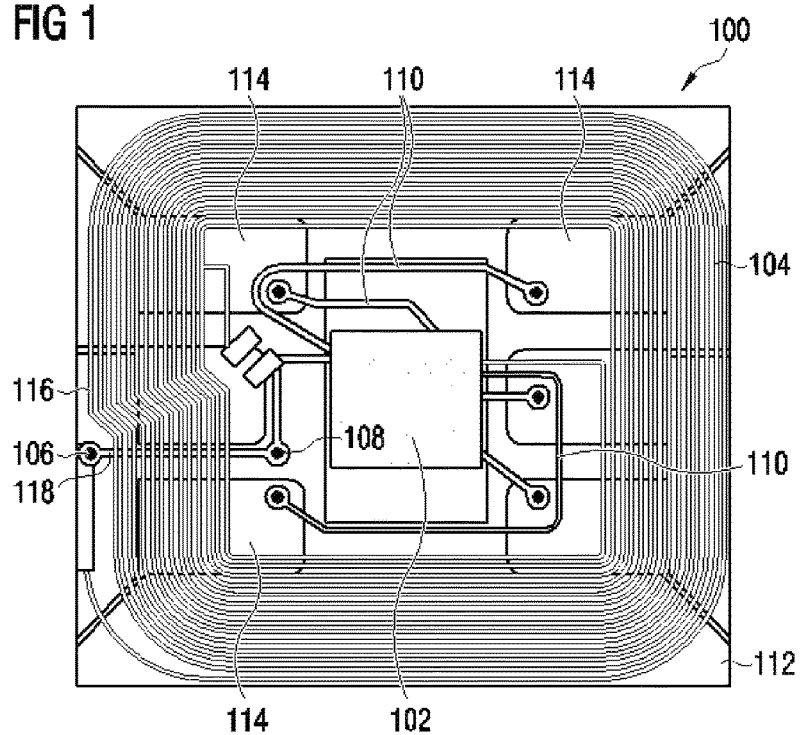

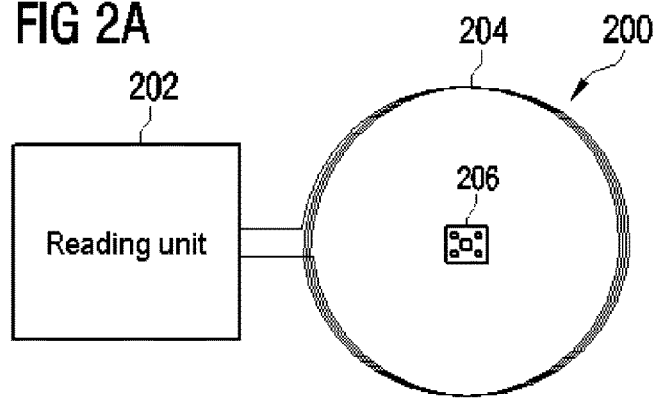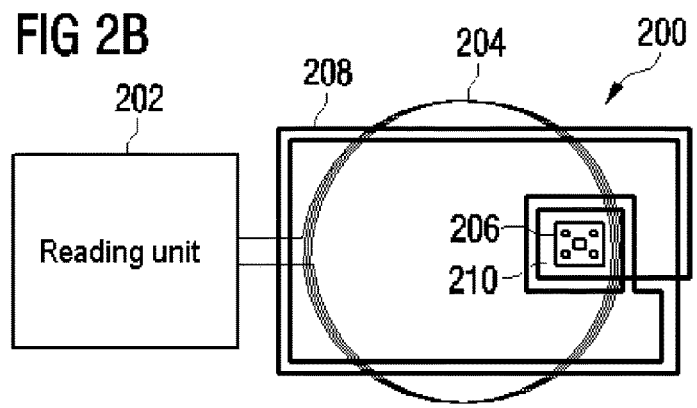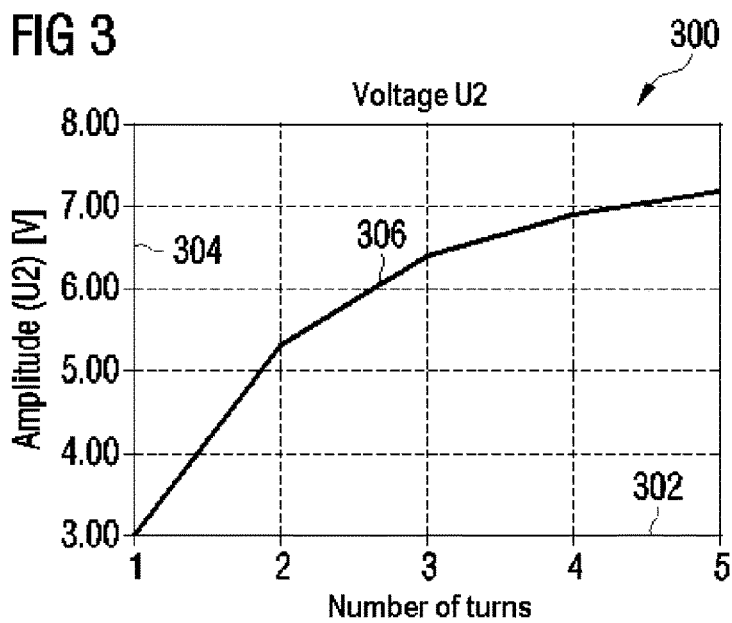

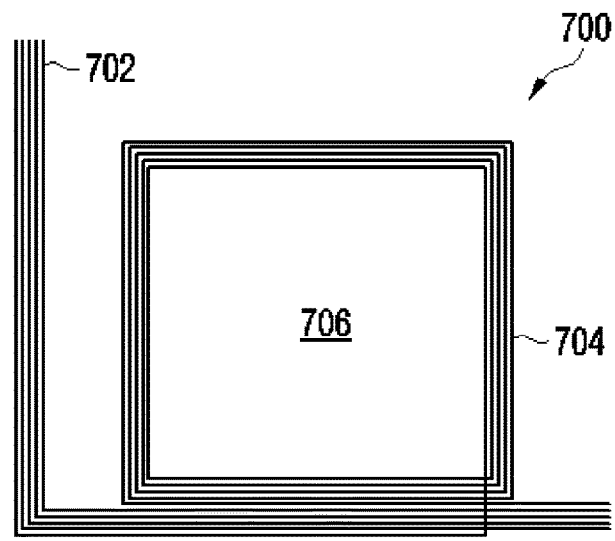
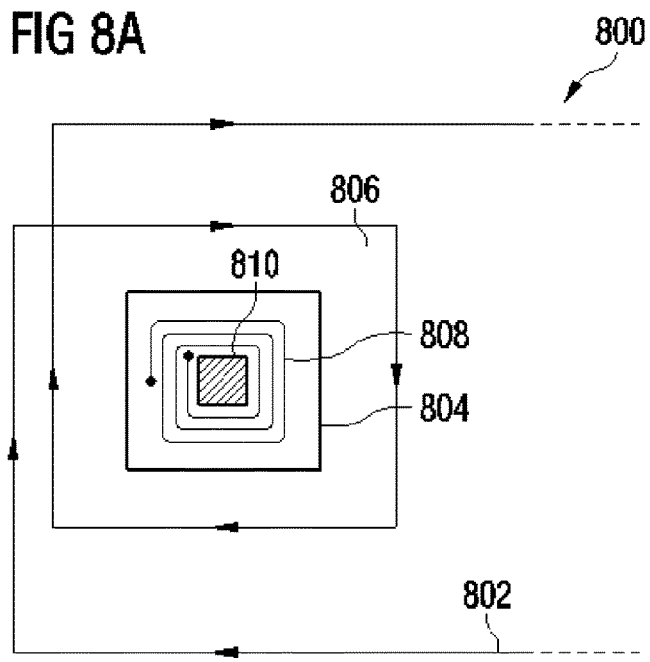

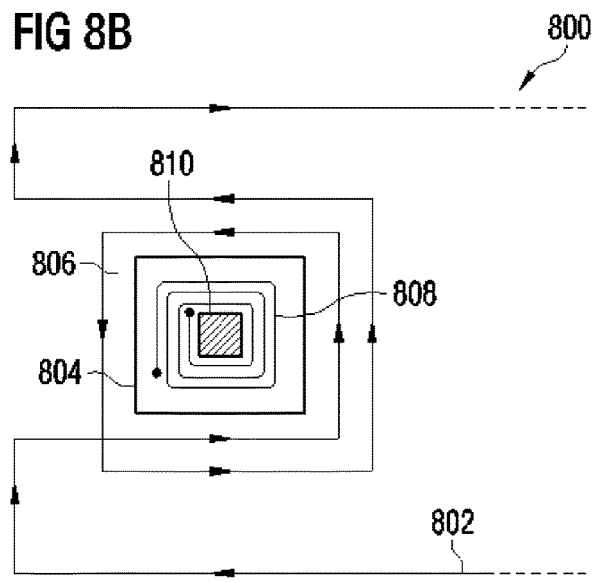
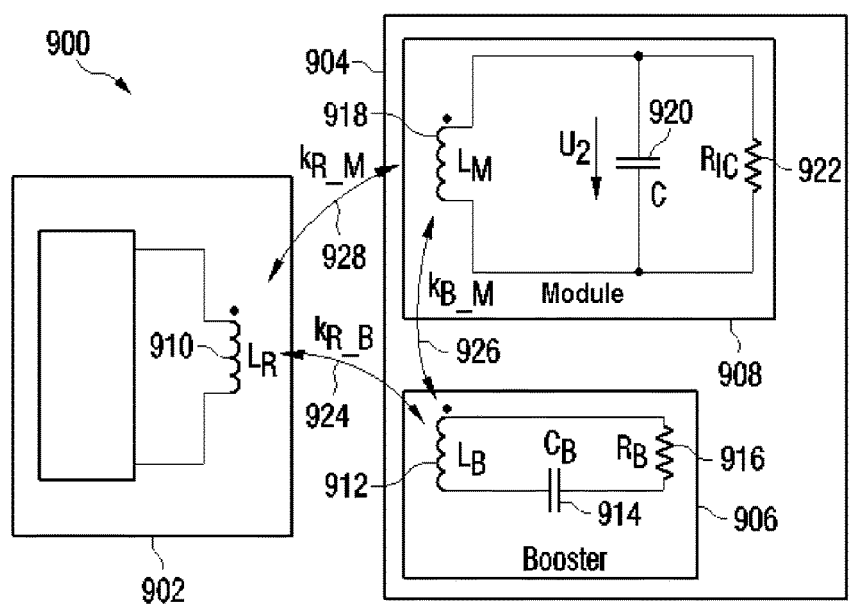

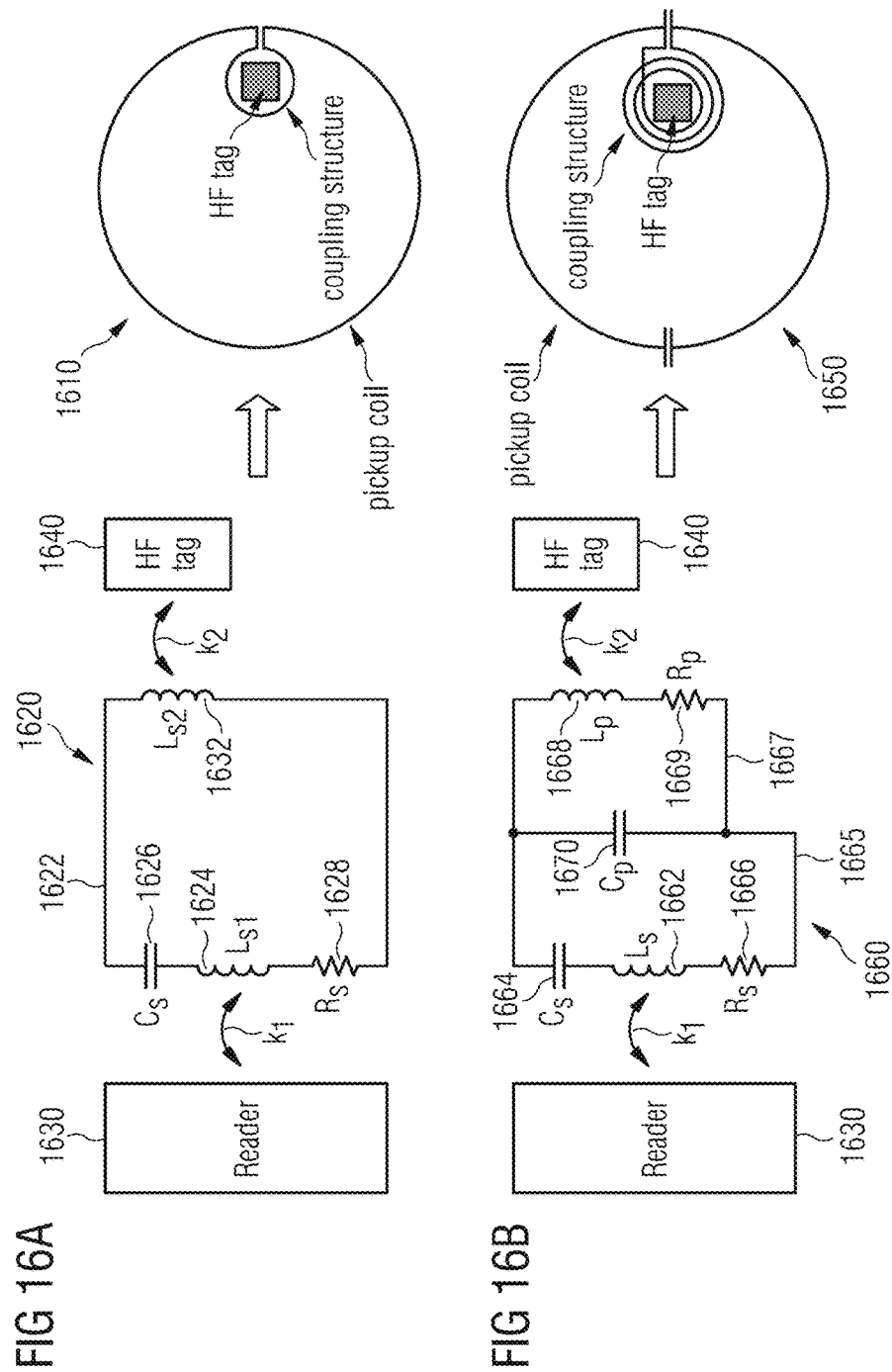

BOOSTER ANTENNA STRUCTURE FOR A CHIP CARD

CROSS-REFERENCE TO RELATED APPLICATION

This application is a continuation in part of U.S. patent application Ser. No. 13/713,123 filed on Dec. 13, 2012, which claims priority to German Patent Application Serial No. 10 2011 056 323.7, which was filed Dec. 13, 2011. The contents of both are incorporated herein by reference in its entirety.

TECHNICAL FIELD

Various embodiments relate to a booster antenna structure for a chip card.

BACKGROUND

In the case of normal chip cards which are widely used, for example in electronic payment transactions, the communication between the chip located on the chip card and a reader is contact-based, i.e. via chip card contacts exposed toward the outside of the chip card. For this purpose, however, the chip card must always be singled out when used and introduced into a corresponding reader which may be considered to be disruptive by a user. An interesting extension which solves the problem is offered by so-called dual interface chip cards in which the chip can also communicate by means of a contactless interface in addition to the normal contact-based interface. The contactless interface on the chip card can have a chip card antenna which is contained in the chip card and connected to the chip. The chip card antenna and the chip can be arranged conjointly on a chip card module wherein such a miniaturized form of the chip card antenna can then be called a chip card module antenna. Independently of the type of chip card antenna, an electrical connection is formed between it and the chip card module or the chip, respectively.

In the case of electronic payment systems, for example, a functional distance of up to 4 cm is required between the chip and the reading unit. However, meeting this target specification may be found to be problematic since it may not be possible in some cases to arrange a sufficiently large chip card module antenna on the small surface available on the chip card module for wireless communication to take place at the required distance. In order to improve the wireless communication capability, a further antenna can be provided in addition to the chip card module antenna, namely an amplifier antenna or booster antenna. The booster antenna can be provided on a separate layer and contained in the chip card. The separate layer which contains the booster antenna can be laminated into the chip card, for example, during its production.

In the case of chip card antennas which are not arranged on the chip card module and therefore have in most cases an adequate size, the use of a booster antenna can be omitted. When completed chip card bodies are equipped with chip card modules, however, the chip card must then be milled precisely so that the contacts provided on the chip card module can be positioned over corresponding contacts of the chip card antenna. The contacts can then be joined together by means of an adhesive, supplying pressure.

The production process described above is costly and complex. In addition, the contact locations between chip card module and the chip card antenna can have little mechanical ruggedness and may become detached in the case of bending and folding processes to which chip cards can be exposed in everyday use. Having regard to these problems, the expected life of a chip card having a chip card antenna may be two years. In general, a far longer life of, for example, ten years would be desirable, for instance when such chip cards are used in governmental facilities where the costs of exchanging or renewing due to the volume of chip cards used could be saved.

To avoid the problems of the mechanically susceptible electrical connection with the chip card module or the chip, respectively, existing in the case of large-format chip card antennas, booster antennas are coupled inductively to chip card module antennas. Normal booster antennas extend in most cases over the entire surface of the chip card, if necessary also over part-areas which are provided, for example, for lettering embossed in the chip card (embossing areas, defined, for example, in ISO/IEC 7811-1 Standard) or are provided for the chip cavity so that such chip cards are basically not ISO/IEC-compliant. Furthermore, there has hitherto not been any optimization of the booster antenna in chip cards with regard to their electrical parameters so that such chip cards cannot be certified, for example, according to the EMVCo Standard—a global standard for credit and ATM cards on the basis of chip card technology.

SUMMARY

In various embodiments, a booster antenna structure for a chip card is provided, wherein the booster antenna structure may include a booster antenna; and an additional electrically conductive structure connected to the booster antenna.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows an exemplary chip card module with chip card module antenna for a chip card;

FIG. 2A shows a transmission system having a reading unit and a chip card module with chip card module antenna without booster antenna structure;

FIG. 2B shows a transmission system having a reading unit and a chip card module with chip card module antenna and with a booster antenna structure according to various embodiments;

FIG. 3 shows a diagram for illustrating the influence of the number of turns of the booster antenna structure according to various embodiments on the voltage induced in the chip card module antenna;

FIG. 7 shows a section of a booster antenna structure according to various embodiments;

FIG. 8A shows a section of a contactless chip card module arrangement according to various embodiments;

FIG. 8B shows a section of a further contactless chip card module arrangement according to various embodiments;

FIG. 9 shows a circuit diagram of a system of reading unit and a contactless chip card module arrangement according to various embodiments;

FIG. 16A shows a schematic diagram of a serial booster antenna structure according to the disclosure.

FIG. 16B shows a schematic diagram of a parallel booster antenna structure according to the disclosure.

DESCRIPTION

Figure 4A:
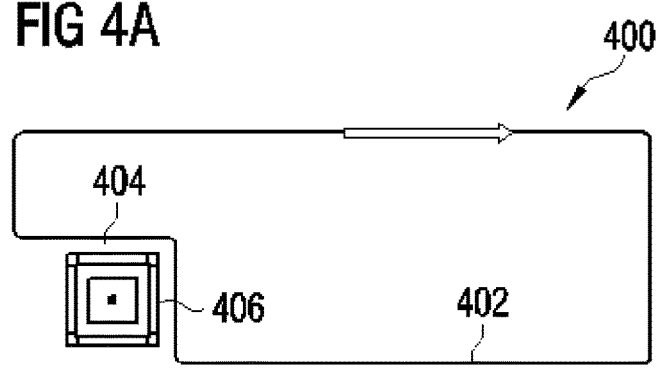
FIGS. 4A to 4F show various contactless chip card module arrangements for forming the inductive coupling area according to the various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In the detailed description which follows, reference is made to the attached drawings which form a part of it and in which, for the purpose of illustration, specific embodiments are shown in which the invention can be exercised. In this regard, directional terminology such as, for instance, "top", "bottom", "front", "rear", etc. are used with reference to the orientation of the figure(s) described. Since components of embodiments can be positioned in a number of different orientations, the directional terminology is used for illustration and is in no way restrictive. Naturally, other embodiments can be used and structural or logical changes can be performed without deviating from the range of protection of the present invention. Naturally, the features of the various embodiments described herein can be combined with one another unless specified differently specifically. The detailed description which follows should, therefore, not be considered in a restrictive sense and the protective range of the present invention is defined by the attached claims.

Within the framework of the present description, the terms "linked", "connected" and "coupled" are used for describing both a direct and an indirect link, a direct or indirect connection and a direct or indirect coupling. In the figures, identical or similar elements are provided with identical reference symbols as far as this is appropriate.

FIG. 1 shows a section of a rear of a chip card module 100 including a chip card module antenna with which a booster antenna structure according to various embodiments may be coupled. The rear of the chip card module 100 may be understood to be the side which is arranged opposite the side of the chip card module on which the chip card contacts are arranged and is thus not visible from the outside after insertion of the chip card module into a chip card body. The chip card module 100 has a carrier 112 on which an integrated circuit in the form of the chip 102 is arranged. As in the embodiment of the chip card module 100 shown, the carrier 112 may be at least partially transparent so that the chip card contacts 114 which are arranged on the front of the carrier 112 are also visible from the rear of the chip card module 100. The chip card contacts 114 are coupled to the chip 102 by means of wiring 110. At the rear of the carrier 112 an off-chip coil 104 is provided and has thirteen turns in the present embodiment. The turns of the off-chip coil 104 are arranged in a ring around the chip 102. Each of the coil turns has an almost square or rectangular shape with rounded corners, the left-hand side having in the present embodiment a kink 116, i.e. a course deviating from a straight line. The kink 116 has the effect that the coil turns are offset toward the center of the off-chip coil 104 and thus an area is created at the outer edge of the coil 104 at which, for example, an end contact 106 of the coil may be arranged. The design of the off-chip coil 104 may be adapted to other components present on the carrier 112 as required. The shape of the coil turns may naturally deviate from the shape shown in FIG. 1 and have, for example, other kinks. The off-chip coil 104 has at its outer end the end contact 106. The end contact 106 is conducted to the front of the carrier 112 by means of a passage and is connected to a contact bridge 118. The contact bridge 118, which is arranged on the front of the carrier 112, is coupled to a further passage which is connected to a further contact 108 which, in turn, is coupled to the chip 102. In this manner, the off-chip coil 104 may be closed without an additional plane having to be built up on the rear of the carrier 112 in which a line could run which crosses the coil turns. The off-chip coil 104 shown in FIG. 1 is a unilateral module antenna, wherein a contact bridge 118 is used on the side of the chip card contacts 112 in order to close the off-chip coil 104. The chip 102 arranged on the carrier 112 may have, for example, an internal capacitor of approximately 40 pF to 100 pF, for example in the range of about 50 pF to 80 pF. The turns of the off-chip coil 104 may have, for example, silver, aluminum, copper, gold and/or conductive alloys and may have a conductor track width of at least 40 μm which can be, for example, about 60 μm, about 80 μm or about 100 μm or about up to 200 μm. The turns of the off-chip coil 104 may be arranged, for example, at a distance of about 80 μm from one another on the carrier 112. Both parameters—conductor track width and conductor track spacing—are parameters which can be adapted with regard to the inductance of the off-chip coil 104 to be achieved.

The chip card module 100 shown in FIG. 1 is a so-called CoM (coil on module) which has the chip and a coil, the coil handling the function of an antenna and providing for contactless communication between the chip and a reading unit. The chip card module 100 may be a dual interface chip card module so that the chip can communicate with a reading unit by means of a contact-connected interface (by means of contacts 114) and by means of a contactless interface (off-chip coil 104). The contactless chip card module according to various embodiments, for example a contactless chip card module of a dual interface chip card, has a resonant circuit which may essentially have the chip and the off-chip coil and can be operated independently. The resonant frequency of the resonant circuit may be set to the operating frequency of the chip in this arrangement and be, for example, approximately 13.56 MHz, this frequency corresponding to one of the frequencies of the RFID (radio-frequency identification) standard in the short-wave band.

FIG. 2A shows a system 200 of reading unit 202 and chip card module 206 with chip card module antenna, but without booster antenna structure. The contactless communication (often also called near-field communication) between reading unit 202 and chip card module 206 is based on electromagnetic waves (for example on one or more magnetic fields), wherein an antenna 204 of the reading unit 202, which can be constructed as a coil, and the off-chip coil arranged on the chip card module 206 are used for transmitting these. In the transmission of signals between reading unit 202 and chip card module 206, a current flow is induced in the chip card module antenna of the chip card module 206 by a clocked magnetic field of the reading unit 202. In the chip card module 206, a load resistance is switched on and off at the clock rate of the signal, which is to be transmitted. This load modulation causes a change in the current flow through the chip card module antenna, which in turn results in a changing reaction of the chip card module antenna to the amplitude of the magnetic field of the reader 202. The modulation of the magnetic field of the reader, caused by the load modulation in the chip card module, can be detected in the reader. In order to improve the performance of the contactless communication of a chip card module, an amplifier antenna (also called booster antenna) can be coupled additionally to the chip card module. FIG. 2B shows a system 220 of reading unit 202 and chip card module 206 with chip card module antenna and with booster antenna structure 208 according to various embodiments. The booster antenna structure 208 acts as an amplifying intermediary, as it were, between the antenna 204 of the reading unit 202 and the off-chip coil of the chip card module 206. The booster antenna structure 208 has larger turn structures than the off-chip coil and is, therefore, capable of stronger or better coupling to the magnetic field emanating from the antenna 204 of the reading unit 202. The booster antenna structure 208 is coupled to the off-chip coil arranged on the chip card module 206 by means of the at least one inductive coupling area 210, i.e. no electrical or bodily contact is required between the circuit which has the off-chip coil and the booster antenna structure 208. The inductive coupling area 210 can have, for example, coupling turns which surround the chip card module 206 and thus the off-chip coil, the coupling turns being coupled out of the turns of the booster antenna 208. Due to the spatial proximity of the turns of the off-chip coil to the coupling turns of the booster antenna 208, electromagnetic coupling can be achieved between the two coils, i.e. one coil can induce currents in the other one. Other embodiments of the at least one inductive coupling area will be explained later.

The coupling or intensity of coupling, respectively, between a chip card module and a booster antenna is an essential component of the contactless performance of an overall system which essentially has the chip card and the reading unit and can be described quantitatively by a coupling factor or coupling parameter, respectively. The number of turns of the booster antenna and the distance between the turns of the booster antenna and the turns of the off-chip coil are important setting parameters in this context, as is the size of the area of overlap of the turns.

The effect which the booster antenna or booster antenna structure has on the voltage induced in the chip card module antenna or in the circuit on the chip card module by an electromagnetic field of a reading unit is illustrated in the diagram 300 shown in FIG. 3. In the diagram 300, the number of turns of a booster antenna is plotted according to various embodiments along the x axis 302. This number of turns can relate to the turns which are larger than the optional coupling turns which may enclose the at least one inductive coupling area. In the embodiment shown in FIG. 2, the booster antenna 208 has two turns and there is an inductive coupling area 210 which is enclosed or edged by two coupling turns, the coupling turns being coupled out of a turn of the booster antenna. In such embodiments, the number of turns is independent of the number of coupling turns. Along the y axis 304, the voltage is plotted which can be induced at the chip and/or the circuit on the chip card module by the electromagnetic field of a reading unit located in the vicinity of the contactless chip card module arrangement according to various embodiments. The graph 306 in the diagram 300 illustrates that with an increasing number of turns of the booster antenna, the induced voltage also increases. However, the gain in voltage per additional turn decreases with an increasing number of turns which is reflected in a rise in the graph 306 decreasing toward greater numbers of turns.

The number of turns of the booster antenna may be limited by the available space. In principle, the booster antenna structure may extend to the area which is limited, for example, by the size of a chip card. In this context, the booster antenna structure can be arranged as a layer within the chip card, for example laminated in, considering, for example, all sizes of chip cards which are contained in the ISO/IEC 7810 Standard. Furthermore, process parameters, for example choice of material, thickness of turn conductor tracks and/or geometry of the turns can be taken into consideration in the selection of the optimum number of turns.

When designing the geometry of the booster antenna, restrictions may occur. For example, the ISO/IEC 7811-1 Standard specifies areas for a chip card in the ID-1 format (ID-1, as one of the chip card formats, is specified in ISO/IEC 7810 Standard) which are not available for the booster antenna. These may be, for example, areas for embossing and/or the area which is covered by the chip card module. Due to these restrictions, the design for achieving optimum coupling between chip card module and booster antenna may be restricted. Too small a number of turns of the booster antenna may result, for example, in suboptimal coupling. If these boundary conditions just mentioned and also contained in the Standard are neglected, improved coupling may be achieved but the corresponding chip cards do not then comply with the ISO/IEC 7811-1 Standard and cannot be used, for example, where embossing plays a role.

The booster antenna structure according to various embodiments follows the approach of estimating the areas available for the design of the booster antenna structure, taking into consideration the respective process parameters for producing the booster antenna structure such as, for example, choice of material, thickness of the turn conductor tracks and/or geometry of the turns. This makes it possible to determine an optimum number of turns of the booster antenna.

In general, a booster antenna structure may be produced, for example, by means of a printing process or of an etching process. In various embodiments, the booster antenna structure can also be installed or produced by galvanizing. Contactless systems of chip card and reading unit can be formed in various manners but they are all subject to similar requirements due to their application.

The electrical requirements are given by the ISO/IEC 14443 Standard, ISO/IEC 10373-6 Standard and the EMVCo Standard (EMVCo: EMV Standard for contactless chip cards; EMV: global standard for credit and ATM cards based on chip card technology), for example the EMV contactless communication protocol specification version 2.0.1, July 2009. One important requirement is the minimum operating field strength, that is to say the minimum field strength at which a correct signal transmission can occur between chip card and reader (and conversely). The minimum load modulation amplitude (LMA) is also of significance. This parameter describes a magnetic field amplitude achievable by means of the load modulation described above, which may effect a change in the magnetic field of the reader within the normal operating range. A further important aspect is the maximum loading effect which relates to the reaction of the chip card on the reader. The chip card is operated by the electromagnetic field of the reader and, in turn, generates its own electromagnetic field which, in turn, loads the reader. The maximum reaction defines an upper limit for this loading effect so that the reader can still operate correctly.

Further demands on booster antenna structures relate to their mechanical characteristics. Thus, the booster antenna structures must be embeddable in the chip cards, i.e. the size of the respective chip card in which a booster antenna structure is used determines the boundaries for a possible dimension of the booster antenna structure. Possible sizes of chip cards may be obtained, for example, from the ISO/IEC 7810 Standard. Furthermore, the design or the shape of the booster antenna itself may be subject to spatial restrictions within the chip card which may result, for example, from areas to be kept free, for example for embossed lettering as specified in the ISO/IEC 7810-11 Standard.

In this context, the production process of the booster antenna structure may run iteratively in accordance with various embodiments. Test models may be produced, surveyed and specified and various parameters may be subsequently adapted for meeting the requirements.

An enlargement of the booster antenna, i.e. an enlargement of the area enclosing the booster antenna has a positive effect on the minimum load modulation amplitude and the minimum operating field strength since the coupling between the reading unit and the booster antenna is increased. At the same time, however, the reaction of the chip card on the reading unit is increased. Generally, a size of the booster antenna may be selected to be such as is allowed in accordance with the corresponding restrictions or specified conditions.

In most cases, enlarging the number of turns of the booster antenna may lead to a lower minimum operating field strength. However, this positive effect is reduced with an increasing total number of turns already present in the booster antenna, as can be seen in the diagram 300 in FIG. 3 (increasingly shallower graph 306 in diagram 300 in FIG. 3). At the same time, however, the achievable minimum load modulation amplitude is reduced with an increasing number of turns of the booster antenna. As a compromise solution, a reasonable number of turns of the booster antenna can be within a range of about two to about five and be, for example, four turns in chip cards in the ID-1 format. Since the coupling parameter or the strength of coupling between the booster antenna and the chip card module or its antenna, respectively, may be changed without significantly influencing other component parameters, it represents a good parameter for aligning the entire system.

FIG. 4A to FIG. 4F show different contactless chip card module arrangements 400, 410, 420, 430, 440, 450 according to various embodiments for forming the inductive coupling area. In each of the figures mentioned, a booster antenna structure 402 is shown, with only the booster antenna being shown, and a chip card module 404 which has an off-chip coil 406 and a chip (not shown separately). The booster antenna 402 is only shown by a line since the geometric arrangement of the off-chip coil 406 of the chip card module 404 with respect to the booster antenna 402 is the focal point of the explanation in FIG. 4A to FIG. 4F. Naturally, the booster antenna structure 402 may have more than one turn, for example two, three, four or more turns, and other components such as capacitors or resistors. In each of FIG. 4A to FIG. 4F, the at least one inductive coupling area is formed by the proximity of the chip card module 404 to the booster antenna. In other words, the at least one inductive coupling area coincides spatially with the location of the chip card module 404. In the embodiments of the contactless chip card module arrangement shown in FIG. 4A to FIG. 4F, the turns of the off-chip coil 406 are arranged to form an approximately square or rectangular shape having rounded corners. In various embodiments, the sides can deviate from a straight course (see also FIG. 1) and/or the off-chip coil 406 may assume other geometric shapes.

In FIG. 4A, an inductive coupling between the booster antenna 402 and the off-chip coil 406 is achieved by the off-chip coil being arranged in such a manner that two sides of the off-chip coil 406 extend over their entire length adjoining and essentially in parallel with the turns of the booster antenna 402. In this arrangement, the off-chip coil 406 is arranged in an outer corner area of the booster antenna 402, i.e. in one corner of the booster antenna 402, and outside an area which is bordered by the turn (or turns) of the booster antenna 402 which is subsequently called booster antenna area. Using geometries of this type, coupling parameters of the order of magnitude of up to 0.1 can be achieved in dependence on the number of turns of the booster antenna 402 and the distance between these and the off-chip coil 406. The contactless chip card module arrangement 400, shown in FIG. 4A, according to various embodiments, may be used if an enclosure of the off-chip coil 404 by the booster antenna 402 is not possible, for example due to areas which are reserved for embossed lettering.

Figure 4B:
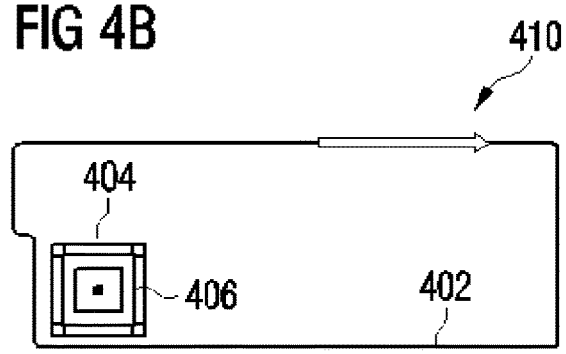

In FIG. 4B, just as in FIG. 4A, two sides of the off-chip coil 406 extend over their entire length adjoining and essentially in parallel with parts of the booster antenna 402, but the chip card module 404 is arranged here within the booster antenna area. In other words, the chip card module 406 is arranged in an inner corner area of the booster antenna 402. In comparison with the contactless chip card module arrangement 400 shown in FIG. 4A, the contactless chip card module arrangement 410 shown in FIG. 4B has a larger coupling parameter, i.e. the booster antenna 402 is coupled better to the off-chip coil 406 there.

Figure 4C:
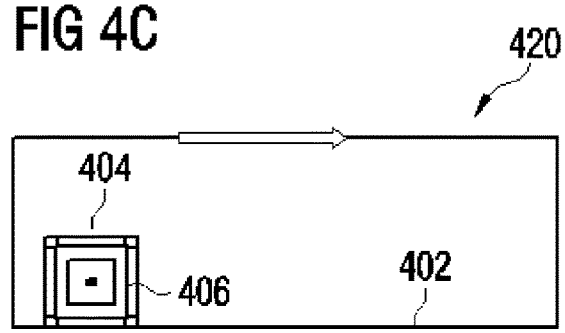

In the exemplary contactless chip card module arrangement 430 shown in FIG. 4C, the chip card module 406 is arranged within the booster antenna area, only one side of the chip card module 404 being arranged immediately adjoining the booster antenna 402. Regarding FIG. 5 and the diagram 600 shown in FIG. 6, immediately adjoining may be understood to be a distance between a turn of the off-chip coil 406 and a turn of the booster antenna of from up to 10 mm in various embodiments.

Figure 4D:
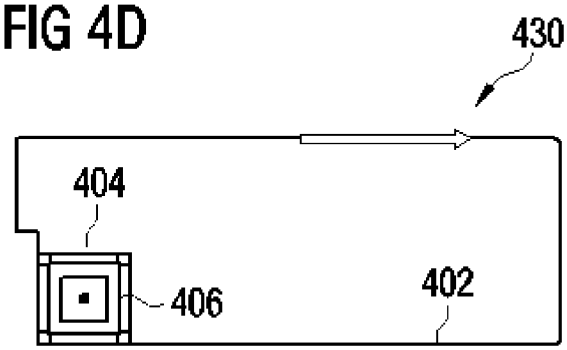

The exemplary contactless chip card module arrangement 440 shown in FIG. 4D corresponds essentially to the exemplary contactless chip card module arrangement 410 shown in FIG. 4B, the distance between the off-chip coil 406 and the booster antenna 402 having been reduced compared with the contactless chip card module arrangement 410 shown in FIG. 4B, i.e. two sides of the off-chip coil 406 are over their entire length immediately adjoining and essentially in parallel with the booster antenna 402. Compared with the exemplary contactless chip card module arrangement 430 shown in FIG. 4C, the exemplary contactless chip card module arrangement 440 shown in FIG. 4D has a greater coupling parameter since in this case a larger section of the off-chip coil 404 (two sides) extends immediately adjoining the booster antenna 402.

Figure 4E:
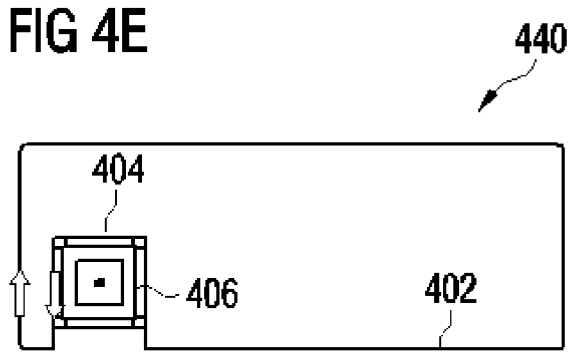

FIG. 4E shows a further exemplary contactless chip card module arrangement 440 in which the booster antenna 402 is arranged immediately adjoining and essentially in parallel with three sides of the chip card module 404 along its complete length, the chip card module 402 being arranged outside the booster antenna area.

Figure 4F:

By comparison, the booster antenna 402 is arranged immediately adjoining and essentially in parallel with three sides of the chip card module 404 along its complete length in the exemplary contactless chip card module arrangement 450 shown in FIG. 4F, but the chip card module 404 is arranged here within the booster antenna area. In comparison with the chip card module arrangement 440 shown in FIG. 4E, a greater coupling parameter is obtained here. Using geometries of this type, coupling parameters of the order of magnitude of between 0.1 and 0.2 can be achieved in dependence on the number of turns of the booster antenna 402 and the distance between these and the off-chip coil 406.

In summary, it can be concluded from the results in FIG. 4A to FIG. 4F that, on the one hand, the arrangement of the chip card module 404 within the booster antenna area and, on the other hand, the smallest possible distance between the off-chip coil 406 (or the turns forming the off-chip coil 406, respectively) and the booster antenna 402 have a positive effect on the coupling parameter, i.e. increase it. Furthermore, the coupling factor grows with increasing number of sides of the off-chip coil 406 which are arranged adjoining the booster antenna 402. In this context, adjoining arrangement is understood to be an arrangement in which the distance between the booster antenna 402 and the off-chip coil 404 is a few millimeters and is, for example, less than 4 millimeters.

Figure 5:
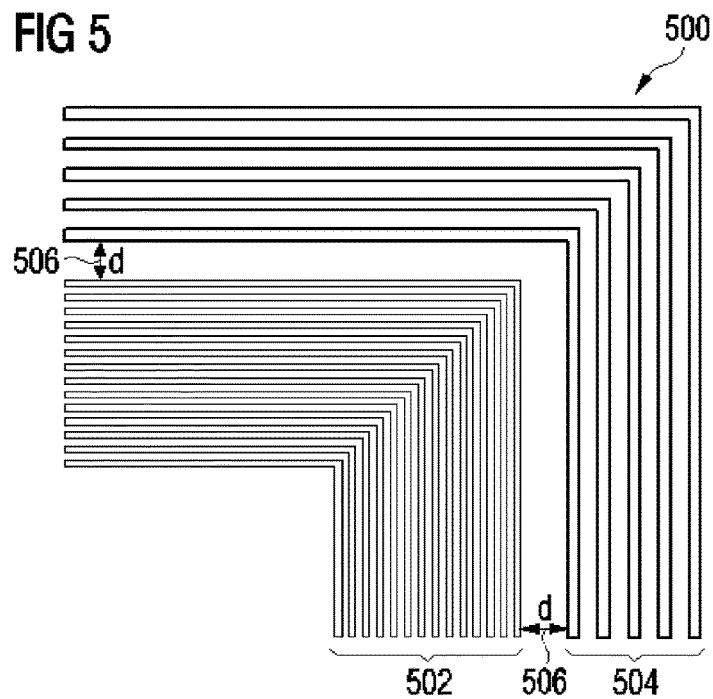
FIG. 5 shows a section of an embodiment of an inductive coupling area.

As has already been found, apart from the number of turns of the booster antenna according to various embodiments, the smallest possible distance between the turns of the booster antenna and the turns of the off-chip coil is also an important parameter which can influence the coupling between booster antenna and off-chip coil. FIG. 5 shows a section of an embodiment of an inductive coupling area 500. The coupling area 500 is formed by a corner area of the booster antenna structure according to various embodiments. The off-chip coil is arranged adjoining one corner of the booster antenna, i.e. two sides of an outer turn of turns 502 of the off-chip coil extend at a distance 506 essentially in parallel with the turns 504 of the booster antenna. As an alternative to the case shown in FIG. 5, the two distances 506 drawn in can also be different.

According to various embodiments, the turn conductor tracks can have a width in a range of approximately 50 μm up to approximately 400 μm and be, for example, about 100 μm. A turn conductor track width in the upper range can result, for example, if the turn conductor track acts additionally as an electrode of a plate capacitor.

In various embodiments, a booster antenna structure for a chip card is provided, wherein the booster antenna structure has a booster antenna and an additional electrically conductive structure connected to the booster antenna. In various embodiments, a booster antenna may be understood to be an amplifier antenna which supports or amplifies the signal transmission between the chip card or the chip card module, respectively, and a reader. In this context, the chip card module may have a resonant circuit which may have essentially a chip card module antenna and the chip. The booster antenna may be an inductive structure, for example an arrangement of turns which may form, for example, a flat coil. The coil may have, for example, a rectangular or polygonal shape or a mixed shape of these, wherein the corners may be rounded. The additional electrically conductive structure may be a structure independent of the booster antenna, i.e. a structure which provides an additional ohmic impedance to the ohmic impedance of the structures which form the booster antenna. The booster antenna structure according to various embodiments may be optimized, for example, with respect to its electrical parameters and its geometry in such a manner that by this means ISO/IEC-compliant chip cards may be provided which also meet the EMVCo Standard.

According to various embodiments of the booster antenna structure, the booster antenna and the additional electrically conductive structure may jointly form an arrangement which has a resonant frequency of approximately 13.56 MHz. In other words, the booster antenna and the additional electrically conductive structure may form a circuit, the resonant frequency of which is approximately 13.56 MHz. This frequency corresponds to one of the RFID (radiofrequency identification) operating frequencies specified according to the ISO/IEC 18000 Standard. The actual resonant frequency may deviate from 13.56 MHz due to component parameter-related deviations from standard parameters. In various embodiments, a deviation of up to about 10% may be considered as acceptable. The arrangement which has the booster antenna and the additional electrically conductive structure can additionally have a capacitance.

According to various embodiments of the booster antenna structure, the additional electrically conductive structure may have a meander structure. In various embodiments, the meander structure may have round structures or serrated structures or structures defined by corners. The meander structure may have, for example, a serpentine shape, wherein the serpentine can have sections of different length between locations of direction changes. As well, at least one corner of the meander structure may be rounded or the meander structure may have a zigzag shape. The meander structure may be designed overall as a periodic structure or also have a string of periodic conductor track sections. As an alternative, the meander structure may have a shape free of symmetry.

According to various embodiments of the booster antenna structure, the electrically conductive structure may also be provided as a discrete component, for example in the form of a line which has a different material in comparison with the lines to which it is connected. Furthermore, the electrically conductive structure may be arranged as tapering of a line in at least one area of the booster antenna structure.

According to various embodiments of the booster antenna structure, the additional electrically conductive structure may have, together with the booster antenna structure, an ohmic impedance of at least 5Ω, for example 10Ω, if the additional electrically conductive structure is interconnected in series with the booster antenna. In the case of a parallel interconnection of the additionally conductor structure with respect to the booster antenna, the impedance of the additionally electrically conductive structure may be, together with the booster antenna structure, for example about 500Ω. In serial interconnection and in parallel interconnection, the booster antenna has different equivalent impedances with respect to the additionally electrically conductive structure. During the design of the booster antenna structure, the ohmic impedance of the entire structure must be taken into consideration, that is to say, for example, impedance of the booster antenna, of the additionally electrically conductive structure and, for example, of a capacitor. Compared with a direct-current resistance, the frequency and the phase of the current or of the voltage must be taken into consideration in the calculation of the resistance in the case of an impedance so that the impedance can differ distinctly from a direct-current resistance of an electronic component such as the additional electrically conductive structure due to effects such as self-inductance, the so-called proximity effect or the skin effect. The actual impedance of the additionally conductive structure can be adjusted, for example, by the choice of material and/or its shape.

According to various embodiments of the booster antenna structure, the additional electrically conductive structure and the booster antenna may be formed from different materials. The booster antenna can have, for example, materials such as Ag, Al, Cu, Au or alloys thereof. As well, the additionally electrically conductive structure can have these materials, independently of the materials selected for the booster antenna. In general, the choice of material can be adapted taking into consideration the shape and the dimension of the additionally electrically conductive material so that a desired resistance value can be set.

According to various embodiments of the booster antenna structure, the additional electrically conductive structure and the booster antenna may be coupled to one another in series. As an alternative, according to further various embodiments, the additional electrically conductive structure and the booster antenna can be coupled to one another in parallel.

According to various embodiments, the booster antenna may have at least one inductive coupling area and be constructed as resonant circuit. The inductive coupling area may be arranged for coupling the booster antenna to a further antenna, for example to a chip card module antenna arranged on a chip card module. By means of the at least one inductive coupling area, the booster antenna may be coupled inductively to the chip card module antenna or to the chip card module, respectively, so that no mechanical contacts need to be provided between these two.

According to various embodiments, the booster antenna structure may further have a capacitor. The capacitor may be connected to the booster antenna and form in such an arrangement, together with the booster antenna and the additionally electrically conductive structure, a resonant circuit.

According to various embodiments of the booster antenna structure, the capacitor may be formed as a plate capacitor. The individual capacitor plates may be constructed on the same side or on different sides of a foil or of a carrier on which the booster antenna structure is arranged. Between the capacitor plates, a dielectric can also be arranged. Generally, the capacitor may have two mutually electrically insulated conductor strings arranged at a distance from one another, wherein the overall structure may have any shape. Thus, the plate capacitor may be present, for example, rolled together to form a spiral shape, each spiral string corresponding to one of the capacitor electrodes. The carrier or the carrier layer may have generally an electrically insulating material, for example a plastic or a plastic laminate, and be present as a foil or as a thin layer of material.

According to various embodiments of the booster antenna structure, the capacitor may have a number of lines arranged next to one another in parallel, wherein every second line is connected to the same capacitor electrode. For example, each of the capacitor electrodes may have a finger structure, the capacitor electrodes being rotated by 180° with respect to one another and arranged in such a manner that at least one finger of one capacitor electrode is arranged between two fingers of the other capacitor electrode, the fingers of the two capacitor electrodes being electrically insulated from one another.

According to various embodiments of the booster antenna structure, the structures which form the capacitor, and the booster antenna structure, may be arranged in the same plane. In this case, no additional structural layer is required in which one of the components is arranged separately, but both the structures forming the capacitor and the booster antenna structure may be formed in a forming process on the same layer, i.e. in the same plane, that is to say, for example, on one or on two sides of the carrier on which the booster antenna structure is arranged. The capacitor may also be configured as line capacitor and arranged, for example, as dummy turn. The dummy turn may have two conductor tracks extending next to one another, the winding direction of the two conductor tracks being opposite with respect to one another so that the dummy turn does not supply any or a negligible contribution to the inductance of the booster antenna structure.

In various embodiments, a contactless chip card module arrangement is provided having a booster antenna structure according to various embodiments and a contactless chip card module which has a chip and a coil which is electrically coupled to the chip, wherein the booster antenna structure may be inductively coupled to the coil of the contactless chip card module by means of at least one inductive coupling area of the booster antenna. The inductive coupling of the coil of the contactless chip card module with the booster antenna structure can be achieved by positioning the coil in the vicinity of the booster antenna. In this context, individual areas of the turns of the chip card module coil which may have, for example, a rectangular or polygonal shape, may extend adjoining the booster antenna on one or more sides. The chip card module arrangement may form a part of a chip card which, for example, meets the ISO/IEC 7810 Standard. In various embodiments, the contactless chip card module arrangement may additionally have a contact-based interface, for example in the form of chip card contacts arranged on the chip card module, by means of which the contactless chip card module arrangement can also communicate contact-based with a reading unit. Due to the electrical or inductive coupling between booster antenna and chip card module antenna, it is not required to form an electrical body contact between the booster antenna and chip card module antenna which also requires precise milling in the chip card or the chip card body, respectively.

According to various embodiments of the contactless chip card module arrangement, the booster antenna structure may be power-matched to the contactless chip card module, wherein the match may be adjustable by means of the additional electrically conductive structure. Such power matching provides for optimum power transmission of signals or energy between the booster antenna structure and the contactless chip card module and can be achieved, for example, by adapting the resistance of the additionally conductive structure to a transformed resistance of the chip card module, the transformed resistance of the chip card module being discussed in greater detail later.

According to various embodiments of the contactless chip card module arrangement, the at least one inductive coupling area of the booster antenna can have a structure enclosing the coil of the contactless chip card module. In this context, the enclosing structure can have an integral part of the booster antenna in the form of an output or extension of a turn of the booster antenna which can then also form a coil which, for example, can surround the coil of the chip card module.

According to various embodiments of the contactless chip card module arrangement, the enclosing structure can have at least two turns which enclose the coil of the contactless chip card module. The at last two turns can then be arranged at an equal distance from all sides of the coil of the chip card module. The distance between the turns of the enclosing structure and at least one side of the coil of the chip card module can be different, however, from the distances between the turns of the enclosing structure and the remaining sides of the coil of the chip card module.

According to various embodiments of the contactless chip card module arrangement, the at least one inductive coupling area of the booster antenna can be arranged in a corner area of the booster antenna. The corner area of the booster antenna can have here two sides, wherein each side can extend adjoining and essentially in parallel with one side of the coil of the contactless chip card module.

According to various embodiments of the contactless chip card module arrangement, the at least one inductive coupling area of the booster antenna can be located within an area which is bounded by conductor tracks forming the booster antenna. This can be the case, for example, if the coil of the contactless chip card module is arranged in an inner corner or at an inner side of the booster antenna, wherein the inner side of the booster antenna can be specified by a turn of the booster antenna coil which is located completely inside. The at least one inductive coupling area can be designed in such a manner that the coil of the contactless chip card module is surrounded essentially along three of its sides by turns of the booster antenna and the at least one inductive coupling area is formed as a type of bay, as it were.

According to various embodiments of the contactless chip card module arrangement, the at least one inductive coupling area of the booster antenna may be located outside an area which is bounded by conductor tracks forming the booster antenna. This can be the case, for example, if the coil of the contactless chip card module is arranged at an outer side of the booster antenna, wherein the outer side of the booster antenna may be specified by a turn of the booster antenna coil which is completely located on the outside. In this context, the at least one inductive coupling area can be formed in such a manner that the coil of the contactless chip card module is surrounded essentially along three of its sides by turns of the booster antenna and the at least one inductive coupling area is formed as a type of bay, as it were.

In various embodiments, a contactless chip card module arrangement is provided having a booster antenna structure according to various embodiments and a contactless chip card module which has a chip and a coil which is coupled electrically to the chip, wherein the booster antenna structure may be coupled inductively to the coil of the contactless chip card module and wherein the electrically conductive structure external to the booster antenna, together with the booster antenna structure, has an ohmic impedance, the value of which results from an operating frequency of the chip, the inductance of the booster antenna and the quality of the booster antenna. In this context, the booster antenna structure may be power-matched to the contactless chip card module. The power matching may be adjustable, for example by means of an adaptation of the booster antenna-external electrically conductive structure, for example a booster antenna resistance. During the adaptation of the ohmic impedance of the booster antenna-external electrically conductive structure, the quality of the booster antenna may also be set and by this means the reaction of the contactless chip card module arrangement to a reading unit can be adjusted. In various embodiments, the booster antenna-external electrically conductive structure may be understood to be a structure which is not a component of the coil turns of the booster antenna but represents an electrically conductive structure which is additional to the turns of the booster antenna, which may be interconnected in parallel or in series with the coil or the turns, respectively, of the booster antenna.

According to various embodiments of the contactless chip card module arrangement, the contactless chip card module may also have chip card contacts which are configured for providing a contact-based chip card interface. The chip card contacts may form a contact field which corresponds to the ISO/IEC 7816 Standard. The contact field can have six or eight individual chip card contacts which may have normal conductive materials.

According to various embodiments of the contactless chip card module arrangement, the contactless chip card module arrangement may be configured as a dual interface chip card module arrangement. The communication with the chip of the dual interface chip card module arrangement may then take place optionally by means of the contact-based interface in the form of the chip card contacts or by means of the contactless interface in the form of the chip card module antenna and the booster antenna. A dual interface chip card may have a chip card module which may have a chip and a coil in the form of conductor track turns which assumes the function of an antenna and provides for the contactless communication. The joint arrangement of the coil and of the chip on one chip card module is also called CoM (coil on module). The interconnection of the chip and of the coil on the chip card module of a dual interface chip card represents a resonant circuit which may be operated independently.

The chip card in which the booster antenna structure and/or the contactless chip card module arrangement may be used may be, for example, a chip card which is compliant with the ISO/IEC 7810 Standard. Accordingly, the chip card may have each of the normal size formats ID-1, ID-2, ID-3, ID-000 (also called mini-SIM format, SIM: Subscriber Identity Module) or 3FF (also called micro-SIM format).

Depending on the size of the chip card, it may also have more than one chip card module. For example, two chip card modules may be arranged on one chip card so that the chip card may be inserted with one of its ends into a reader or pulled through such a one and the user can thus select which chip card module is to be used. In this case, each chip card module antenna may be arranged in a separate inductive coupling area.

Figure 6:
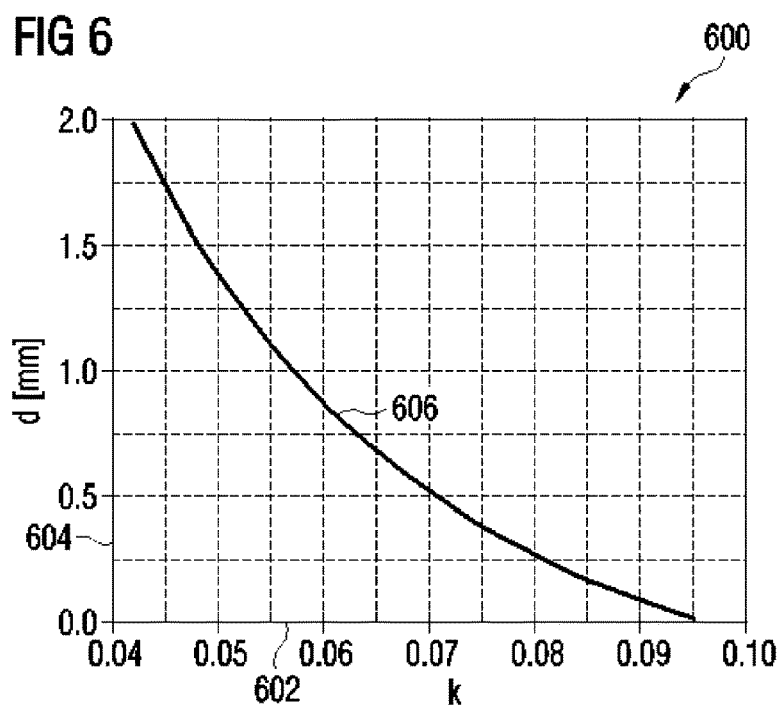
FIG. 6 shows a diagram for illustrating the dependence of a coupling factor on the distance between turns of the chip card module antenna and booster antenna turns.

The influence of the distance between the turns 502 of the off-chip coil and the turns 504 of the booster antenna on the strength of coupling or the coupling parameter k, respectively, is shown in diagram 600 in FIG. 6. The coupling parameter is plotted along the x axis 602 of diagram 600 and the distance 506 drawn in FIG. 5 is plotted along the y axis 604. The coupling parameter may be understood in various embodiments to be a measure in which a current flowing through particular turns (off-chip coil or booster antenna) is capable of inducing a current flow in the other turns (booster antenna or off-chip coil). From curve 606 in diagram 600, it may be seen that the coupling parameter k becomes ever smaller the greater the distance 506 between the outer one of turns 502 of the off-chip coil and the adjoining turn of turns 504 of the booster antenna.

FIG. 7 shows a section of a booster antenna structure 700 according to various embodiments. The at least one inductive coupling area 706, within which an off-chip coil of a chip card module may be arranged, is formed in this case by coupling turns 704 or surrounded by these, respectively. The coupling turns 704 may be formed by an extended turn of the turns 702 of the booster antenna, wherein their number can be within a range of between one and approximately five depending on the existing space and desired strength of coupling and may be, for example, three. Using such geometries, the highest strengths of coupling, which can be within a range of from 0.2 to 0.3, may be achieved in dependence on the number of coupling turns 704, the number of turns 702 of the booster antenna and/or the distance of the turns of the off-chip coil from the coupling turns. The case may also occur in which an overlap can occur between the chip card module antenna of the chip card module and the booster antenna on at least one of the sides if, for example, the area of the chip card module antenna is greater than the inductive coupling area which is fixed by the coupling turns 704.

Further embodiments of the at least one inductive coupling area are shown in each case in FIG. 8A and FIG. 8B. In both figures, a section of a contactless chip card module arrangement 800 according to various embodiments is shown which has the at least one inductive coupling area 806. Within the at least one inductive coupling area 806, the chip card module 804 is arranged on which the chip 810 surrounded by the off-chip coil 808 is located. The at least one inductive coupling area 806 is formed by parts of the booster antenna 802 both in FIG. 8A and in FIG. 8B. In both figures, booster antenna 802 is shown simplified by only one turn; naturally, there can be further turns. As in FIG. 7, for example, the inner turn can have a part-piece which is constructed to form a small coil in the form of small turns which border the at least one inductive coupling area 804 as shown in FIG. 8A and in FIG. 8B, wherein the turns enclosing the at least one inductive coupling area 804, in deviation from the presentation in the figures, also have rounded corners and/or have a round, oval or polygonal shape. The distance between each of the sides of the chip card module 806 or the off-chip coil, respectively, from the sides of the inner turn of the at least one inductive coupling area 806 can be different for at least one of the sides. In other words, the chip card module 804 does not need to be arranged centrally or symmetrically within the at least one inductive coupling area 806. In FIG. 8A and in FIG. 8B, the arrows show a possible direction of current flow within the booster antenna 802. In the embodiment shown in FIG. 8A of the booster antenna structure 800, the direction of current flow within the booster antenna 802 or within its turns, respectively, matches the direction of current flow within the smaller turns enclosing the at least one inductive coupling area 804. In other words, the direction of the electromagnetic field which is generated by current flow through the turns of the booster antenna 802 without taking into consideration the at least one inductive coupling area 806 matches the direction of the electromagnetic field which is generated by the current flow through the smaller turns enclosing the at least one inductive coupling area 806. In the embodiment shown in FIG. 8B of the booster antenna structure 800, the direction of current flow within the booster antenna 802 or within its turns, respectively, does not match the direction of current flow within the smaller turns enclosing the at least one inductive coupling area 804, the directions of current flow are opposite one another in this case. In other words, the direction of the electromagnetic field which is generated by current flow through the turns of the booster antenna 802 without taking into consideration the at least one inductive coupling area 806 is arranged opposite the direction of the electromagnetic field which is generated by current flow through the smaller turns enclosing the at least one inductive coupling area 806. Furthermore, it must be noted that both alternatives provide good inductive coupling of the booster antenna 802 with the chip card module 804 or the off-chip coil 808, respectively.

In the case of the embodiments of the booster antenna structure, shown in FIG. 8A and in FIG. 8B, the sensitivity of the accuracy of positioning of the chip card module 804 within the at least one inductive coupling area 806 has been investigated. As a result, it has been determined that deviations of up to about 1.5 mm of the chip card module in one of the three spatial directions from its specified position can scarcely be detected, that is to say system variables such as response field strength or load modulation amplitude change only insignificantly. From a deviation of about 2 mm of the chip card module in one of the three spatial directions from its predetermined position, changes can be detected which, however, still provide for correct operation of the contactless chip card module arrangement. Overall, it can be concluded from this that the contactless chip card module arrangement according to various embodiments is insensitive to displacements or positioning errors of the chip card module with respect to the booster antenna structure which can considerably simplify the production of a corresponding chip card which can have the contactless chip card module arrangement according to various embodiments.

FIG. 9 shows a circuit diagram 900 of a system having a reading unit 902 (also called PCD (proximity coupling device)) and a contactless chip card module arrangement 904 (also called PICC (proximity integrated circuit card)) according to various embodiments. The reading unit 902 has a reading unit antenna 910 which can be formed as a coil. The contactless chip card module arrangement 904 which, for example, can be part of a contactless chip card or of a dual interface chip card has a chip card module 908 and a booster antenna structure 906. The chip card module 908 has an off-chip coil 918 which is connected to the chip which is modeled by a parallel circuit of an on-chip capacitor 920 and an on-chip resistor 922, the latter representing the ohmic consumption of the chip. The on-chip capacitor 920 can also represent a (parasitic) capacitor, connected in parallel with the on-chip coil 918, of the chip card module antenna and/or an off-chip capacitor. In addition, a further resistor can be connected in series with the off-chip coil 918. The booster antenna structure 906 is represented by a resonant circuit in the form of a series circuit which has a booster antenna coil 912, a booster capacitor 914 and an additional electrically conductive structure, for example a booster resistor 916. In the circuit of the booster antenna structure 906, the booster resistor 916 may also be connected alternatively in parallel with the arrangement which has the booster antenna coil 912 and the booster capacitor 914. The three part-systems may be coupled electromagnetically to one another. A first arrow 926 identifies the electromagnetic coupling between the booster antenna structure 906 and the off-chip coil of the chip card module 908, the second arrow 924 identifies the electromagnetic coupling between the booster antenna structure 906 and the reading unit 902 and a third arrow 928 identifies the electromagnetic coupling between the reading unit 902 and the off-chip coil 918 of the chip card module 908.

One of the aims in designing the booster antenna structure can consist in reducing the reaction effect below a certain limit which can be given, for example, by the ISO/IEC 10373-6 Standard or by the EMV contactless communication protocol specification 2.0.1, without increasing the required minimum operating field strength in doing so. The reaction effect may be reduced, for example, by reducing the quality factor of the booster antenna which results from the product of the operating frequency and the inductance of the booster antenna coil 912 divided by the booster resistance 916. The reduction in the quality factor can be achieved by increasing the booster resistance 916 and a further resistance which results from a transformation of the chip card module circuit 908 into the booster antenna structure circuit 906 due to the electromagnetic coupling between booster antenna 912 and the off-chip coil 918. In the case where the resonant frequency of the resonant circuit which has the chip card module antenna and the chip, corresponds to the operating frequency, this transformed resistance of the chip card module $R_{Mtr}$ is obtained as $$R_{Mtr} = \frac{R_{IC} k_{BM}^2 L_B}{L_M},$$

where $R_{IC}$ corresponds to the on-chip resistance 922, $k_{BM}$ corresponds to the strength of coupling 926 between the booster antenna structure 906 and the off-chip coil 918, $L_B$ corresponds to the inductance of the booster antenna coil 912 and $L_M$ corresponds to the inductance of the off-chip coil 918. A normal on-chip resistance $R_{IC}$ can be, for example, 1 kiloohm, a normal inductance of the off-chip coil can be, for example, 2.4 microHenry.

The sum of the booster resistance 816 and the transformed resistance of the chip card module $R_{Mtr}$ corresponds to a total resistance $R_{total}$ which determines the reaction effect. In the case of chip cards in the ID-1 format (according to ISO/IEC 7810 Standard), the total resistance $R_{total}$ can be, for example, approximately 65 ohms. To achieve power matching between the chip card module and the booster antenna structure, the transformed resistance of the chip card module $R_{Mtr}$ and the booster resistance 916 can be selected to be approximately equal. This makes it possible that an optimum of power can be transferred between chip card module and booster antenna. The booster resistance 916 can be adapted, for example, via the width of the turn conductor tracks of the booster antenna 912 and/or by means of a suitable choice of the total length of the booster antenna 912 without the inductance of the booster antenna 912 and the booster antenna area, i.e. the area which is bordered by the booster antenna turns, being changed significantly.

Figure 10:
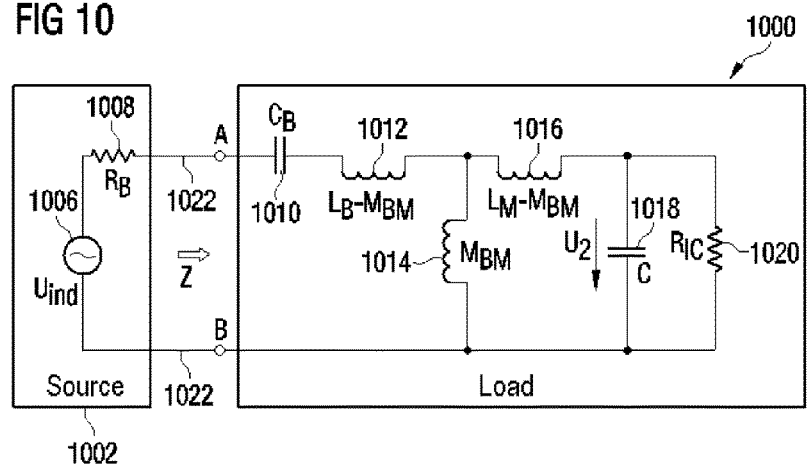
FIG. 10 shows a circuit diagram of a system of a contactless chip card module arrangement according to various embodiments.

The aspect of power matching between chip card module and booster antenna is clarified by means of FIG. 10 which shows an equivalent circuit diagram of a contactless chip card module arrangement 1000 having a chip card module antenna, a chip and a booster antenna according to various embodiments. A reading unit can induce in the booster antenna a voltage which is shown as voltage source 1002 in the equivalent circuit diagram of the contactless chip card module arrangement 1000. The voltage source 1002 has a voltage generator 1006 which represents the induced voltage, and an internal impedance 1008 which takes into consideration the ohmic resistance of the booster antenna structure. The inductive coupling between booster antenna and chip card module antenna within the contactless chip card module arrangement 1000 according to various embodiments is taken into consideration here by means of an equivalent T circuit which has a first inductance 1014 ($M_{BM}$), a second inductance 1012 ($L_B$–$M_{BM}$) and a third inductance 1016 ($L_M$–$M_{BM}$). The contactless chip card module arrangement 1000 which can be, for example, a part of a contactless chip card or of a dual interface chip card, has a chip card module and a booster antenna structure which are shown as one unit for simplification in the circuit diagram in FIG. 10. The chip card module has an off-chip coil which is represented in the third inductance 1016 which is connected to the chip which is modeled by means of a parallel circuit of an on-chip capacitance 1018 and an on-chip resistance 1020. The booster antenna structure is modeled by a series circuit which has a booster antenna coil which is represented in the second inductance 1012, the resistance 1008 and a booster capacitance 1010.

Normal chip card systems with inductive coupling between a chip card module and a booster antenna do not meet the requirements of relevant performance standards for chip cards such as EMVCo and/or ISO/IEC 10373-6. One possibility of solving this problem consists in optimizing the power transfer by selectively matching the booster antenna to the chip card module which has the chip card module antenna and the chip.

Optimizing the power transfer can involve a number of aspects. On the one hand, the resonant chip card module circuit (e.g. see chip card module circuit 908 in FIG. 9), which essentially has the chip and the off-chip coil, can be set to the operating frequency of the chip for this purpose which can be, for example, at 13.56 MHz. The resonant frequency of the resonant chip card module circuit can be adjusted, for example, by means of adapting the inductance of the off-chip coil and/or by providing an additional off-chip capacitance. On the other hand, the resonant frequency of the booster antenna circuit (e.g., see booster antenna circuit 906 in FIG. 9) can also be set to the operating frequency of the chip, that is to say, for example, to 13.56 MHz. The resonant frequency of the booster antenna circuit can be adjusted, for example, by means of the additional electrically conductive structure connected to the booster antenna or by means of a capacitance. Furthermore, the quality factor of the booster antenna can be determined and adapted by means of the additionally electrically conductive structure (e.g. booster resistance 916 in FIG. 9) in such a manner that it corresponds to the real component of a complex impedance (see complex impedance Z in FIG. 10) which corresponds to the electrical impedance which is produced by introducing a chip card with a contactless chip card module arrangement into the electromagnetic field of the antenna of the reading unit in its circuit. In other words, by adjusting the quality factor of the booster antenna, for example by means of the additionally electrically conductive structure, the reaction effect of the booster antenna structure on the reading unit can be adjusted so that a maximum standardized effect of reaction on the reading unit or the antenna of the reading unit, respectively, is not exceeded. At the same time, the power matching between the booster antenna and the chip card module or the off-chip coil, respectively, provides for operation at a working field strength required as standard. Overall, it is possible to say that the booster antenna structure can be adapted individually for various chip cards as a result of which relevant standards for contactless systems can be met.

As already mentioned, a capacitor may be provided in the booster antenna structure for adjusting the resonant frequency of the booster antenna which can lie, for example, at 13.56 MHz. The capacitor may be produced in various ways. If both surfaces of the layer are available in which or on which the booster antenna structure is formed (called carrier layer in the text which follows), the capacitor may be formed, for example, in the form of a plate capacitor, where one plate each can be arranged on one surface in each case. If the capacitor is to be formed on only one of the surfaces, capacitors may be provided which have conductor tracks extending adjacent to one another which have, for example, a finger structure or a spiral structure. In each case, the required capacitance value $C_B$ of the capacitor may be calculated as follows:

$$C_B = \frac{1}{(2\pi f_{res})^2 L_B},$$

where $f_{res}$ is the resonant frequency of the circuit and $L_B$ is the inductance of the booster antenna.

The capacitance C of plate capacitors in which the capacitor plates are arranged on different sides of the carrier layer is obtained, on the one hand, from the area A of one of the plates or electrodes of the capacitor and, on the other hand, from the thickness d and the dielectric conductivity ε of the layer or of the substrate on which the booster antenna is arranged:

$$C = \varepsilon \frac{A}{d}.$$

Figure 11A:
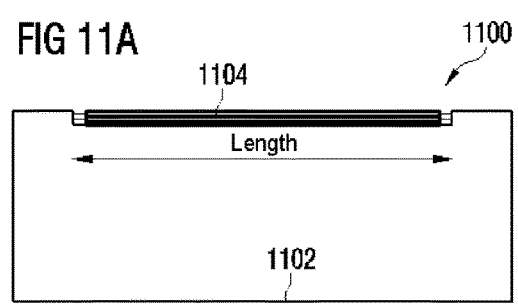
FIG. 11A shows a booster antenna structure according to various embodiments with a finger capacitor.
Figure 11B:
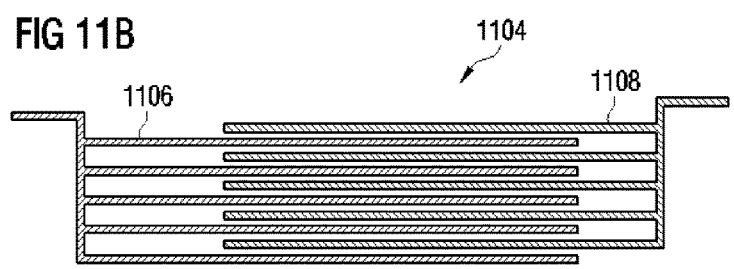
FIG. 11B shows an enlarged view of the finger capacitor shown in FIG. 11A.

FIG. 11A shows a possible embodiment of a capacitance 1104 of the booster antenna structure 1100 which has a finger shape (finger capacitor in the text which follows) and is connected in series with the booster antenna 1102, the booster antenna 1102 being represented here by only one turn, by way of example. An enlarged view of the finger capacitor 1104 is shown in FIG. 11B. The finger capacitor 1104 has a first electrode 1106 and a second electrode 1108 which in each case have a comb-like or finger-like structure and form a so-called interdigital structure. In other words, the electrodes have a number of conductor tracks extending in parallel next to one another, one conductor track of the other electrode being arranged in each case between two conductor tracks each of one electrode. The capacitance may be adjusted, for example, by means of a suitable number of the conductor track fingers per electrode and/or the proportion by which the fingers of the two electrodes overlap or are pushed into one another and/or the size of the free spaces between the fingers of an electrode and/or by providing a dielectric material between the fingers and/or the dimension of the conductor tracks forming the fingers, i.e. the dimension of the cross sectional area of the conductor tracks forming the fingers.

Figure 12A:
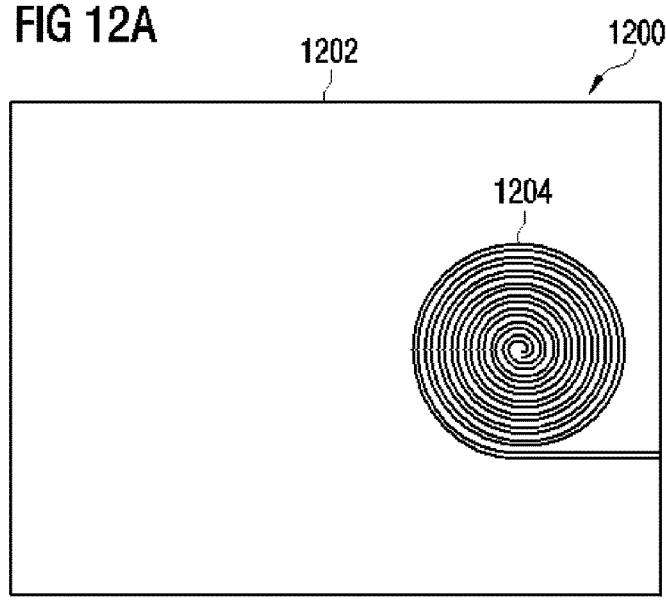
FIG. 12A shows a booster antenna structure according to various embodiments with a spiral capacitor.

A further possible form which the capacitance can have is shown in FIG. 12A. To illustrate, the booster antenna structure 1200 is here also represented by only one turn 1202 and connected to a spiral capacitor 1204. A spiral capacitor 1204 may be understood in various embodiments to be a capacitor which has two conductor tracks forming a conductor track string and extending next to one another, the conductor track string being rolled together to form a spiral. In this arrangement, the spiral does not need to have a circular shape, it can also be oval or a polygon having rounded corners. The capacitance value of the spiral capacitor is adjustable, for example by adapting parameters which have already been mentioned in conjunction with the finger capacitor.

Figure 12B:
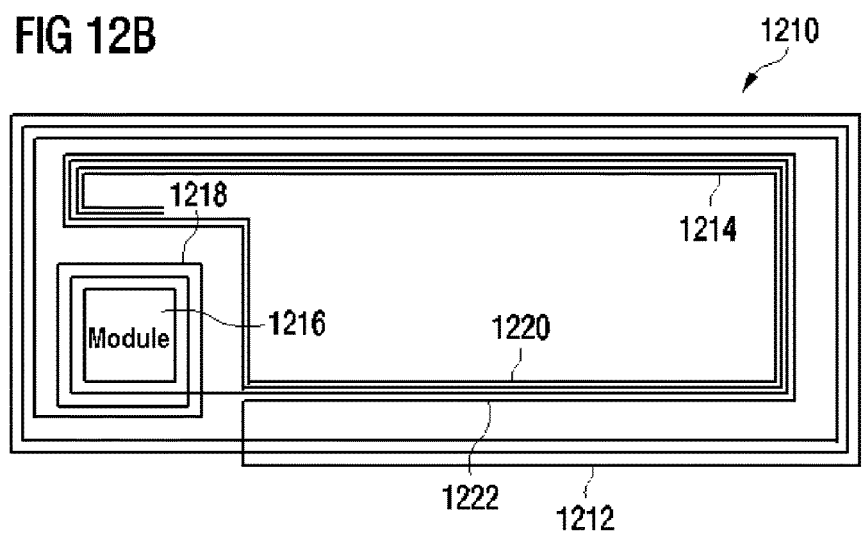
FIG. 12B shows a booster antenna structure according to various embodiments with a dummy turn as capacitor.

Another further possible shape which the capacitance can have is shown in FIG. 12B. The booster antenna structure 1210 has three turns 1212 in this case. Furthermore, the end of the inner turn of the turns 1212 of the booster antenna structure 1210 is followed by an inductive coupling area 1216 which is surrounded by coupling turns 1218. The, for example, three coupling turns 1218 are here formed from an extension of one end of an inner turn of the turns 1212 of the booster antenna structure 1210. The end of the conductor track formed by the coupling turns 1218 is followed by a dummy turn 1214 which forms the capacitor. The dummy turn 1214 has two conductor tracks extending in parallel next to one another, the first conductor track 1220 being coupled to the end of the conductor track which forms the coupling turns 1218 and the second conductor track 1222 being coupled to the end of the outer turn of the turns 1212 of the booster antenna structure 1210. The first conductor track 1220 and the second conductor track 1222 have an opposite direction of circulation with respect to one another. The ends of the first conductor track 1220 and of the second conductor track 1222 are open or are not connected to any other structure analogously to the end of the conductor track double string which forms the spiral capacitance 1204 in FIG. 12A. The double string which is formed by the first conductor track 1220 and the second conductor track 1222 as such has two turns, wherein its course can deviate from the course shown in FIG. 12B and can be matched to unoccupied areas in the plane of the booster antenna structure 1210 or to areas to be kept free which, for example, are reserved for embossed lettering.

Figure 13A:
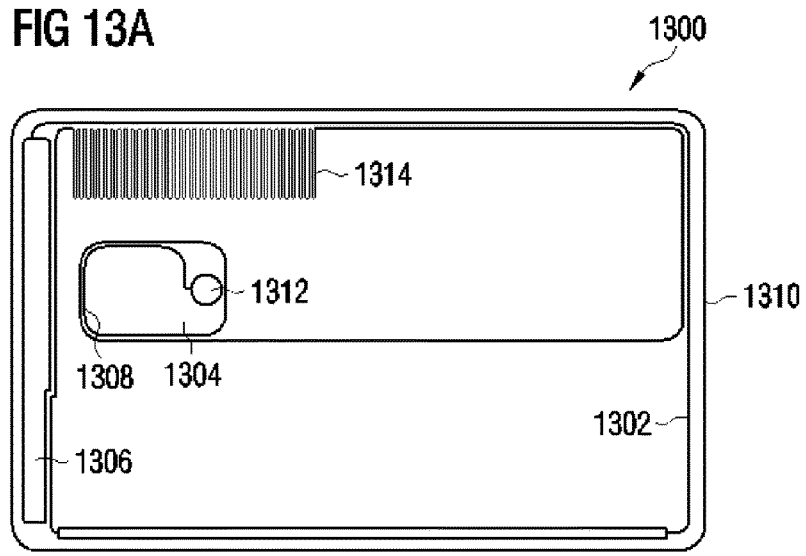
FIG. 13A shows a top of a booster antenna structure according to various embodiments.
Figure 13B:
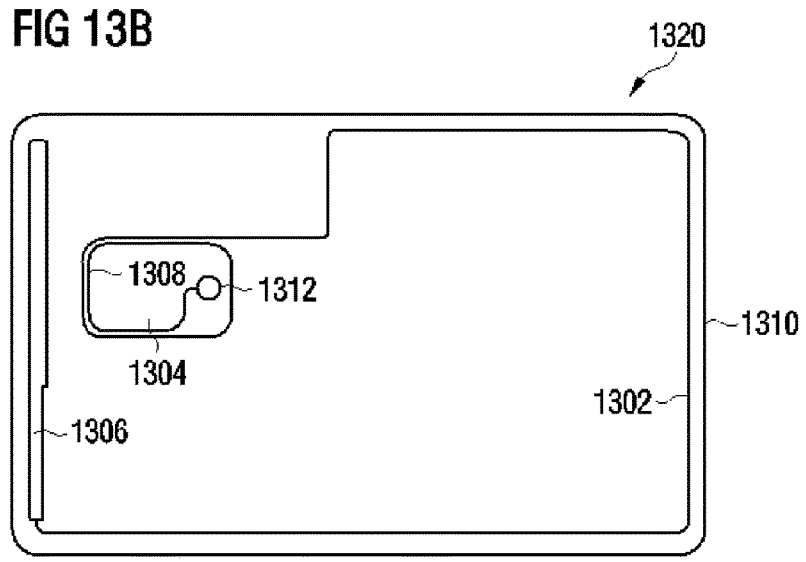
FIG. 13B shows a bottom of a booster antenna structure according to various embodiments.

FIG. 13A shows an embodiment of a front or top 1300 and FIG. 13B shows an embodiment of a bottom or rear 1320 of a booster antenna structure. The embodiment is based on a two-sided design, i.e. a design formed on both surfaces of the carrier layer 1310 on which the booster antenna structure is arranged. The embodiment shown in FIG. 13B and FIG. 13B of a booster antenna structure may be produced, for example, by printing conductive structures on the substrate 1310 or by means of electroplating, but analogous structures may also be produced by means of an etching process. On the basis of the considerations presented here, an antenna booster structure according to various embodiments or a contactless chip card module arrangement according to various embodiments may be produced cost-effectively which meets the ISO/IEC 14443 Standard and/or the ISO/

IEC 10373-6 Standard and/or the EMVCo Standard, taking note of the areas reserved for embossing.

The embodiment of a booster antenna structure shown in FIG. 13A and FIG. 13B may have a carrier layer or a carrier substrate 1310 which can have, for example, PVC. The substrate 1310 can have the size of a chip card in ID-1 format (80 mm×48 mm). The structures arranged thereon can be distributed in such a manner that areas which are provided, for example, for embossing on the chip card, are kept free. In this embodiment, the booster antenna 1302 has two turns—one on the front and one on the rear of the carrier layer 1310, each of these turns extending close to the edge of the carrier layer 1310 in order to be extended essentially over the entire size of a chip card. The turn on the front 1300 of the booster antenna structure is connected to the turn on the rear 1320 of the booster antenna structure by means of through-contacting 1312. Apart from the two main turns, the booster antenna has additionally two coupling turns 1308 which are also arranged on both sides of the carrier layer 1310 and surround the at least one inductive coupling area 1304. In the embodiment shown in FIG. 13A to FIG. 13C, the through-contacting 1312 connects the ends of the coupling turns 1308 to one another through the carrier layer 1310, these ends being connected in each case on the front 1300 and the rear 1320 of the booster antenna structure to one end of the turn of the booster antenna 1302. The way in which the coupling area 1304 is formed corresponds essentially to the principle already shown in conjunction with, for example, FIG. 7. Furthermore, an electrode of a plate capacitor 1306 is arranged on each surface of the carrier layer 1310. The electrodes are arranged above one another on the different sides or surfaces of the carrier layer 1310 and have essentially a distance from one another which corresponds to the thickness of the substrate 1310. With an inductance of the booster antenna coil 1302 of, for example, two microHenry, the coupling parameter between the off-chip coil (not shown) and the booster antenna 1302 may be approximately 0.2. The total resistance $R_{total}$ may be 65 Ohms so that both the booster resistance and the transformed resistance of the chip card module $R_{Mtr}$ should be approximately 32 ohms for the purpose of power matching. Furthermore, an electrically conductive structure 1314 which has a meander shape is coupled to one another in series with the coupling turns 1308 within the booster antenna structure. In this embodiment, the first additional electrically conductive structure 1314 is arranged on the front 1300 of the booster antenna structure. As an alternative, it may also be arranged on the rear 1302 of the booster antenna structure.

Figure 13C:
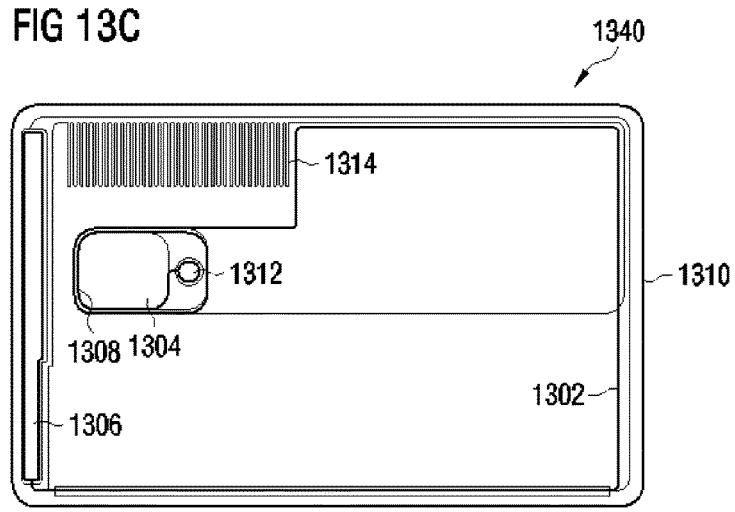
FIG. 13C shows an overlaid view of the top of the booster antenna structure from FIG. 13A and the bottom of the booster antenna structure from FIG. 13B.

FIG. 13C shows a booster antenna structure 1340, showing here the front or top, respectively, 1300 from FIG. 13A and the bottom or rear, respectively, 1320, from FIG. 13B in a superimposed view.

In order to provide a correspondingly dimensioned additionally electrically conductive structure in the form of the booster resistor, a technology can be selected for its production which normally exhibits a higher resistance in conjunction with small conductor track widths such as, for instance, a printing process in which functional electronic materials present in liquid or pasty form may be printed onto the carrier layer 1310. Furthermore, the conductor track width and the conductor track thickness, that is to say the conductor track cross section, can be reduced until the desired resistance value is achieved. The length of the booster antenna or its turns, respectively, can also be extended in such a manner that the other parameters of the booster antenna, for example the inductance of the booster antenna, are not significantly changed. In the embodiment of the booster antenna structure shown in FIG. 13A and FIG. 13B, the thickness of its conductor tracks can be 5 μm and the width of its conductor tracks can be 100 μm in order to achieve a resistance value of about 32 ohms when using an etching technique with copper as the conductive material. The precise parameters may be determined by accurate measurement of the resistance and/or the effect of reaction on a reading unit. The resonant frequency may be adjusted in a simple manner, for example by trimming the plates of the capacitor 1306 with a cutting tool until the desired resonant frequency of, for example, 13.56 MHz is reached.

The booster antenna structure according to various embodiments can be formed by means of various production methods. However, various production methods have a different effect on electrical characteristics of the booster antenna structure. This means that it may be necessary to produce a separate design for each of the different production methods in order to produce a particular booster antenna structure according to various embodiments. In other words, a booster antenna structure which is identical with respect to operating parameters can be formed from various designs since different production methods have different effects on electrical characteristics of electrical structures. Furthermore, it should also be taken into consideration that in designing the booster antenna structure for a chip card in ID-1 format, certain areas are not available for the booster antenna structure such as, for instance, a chip cavity into which the chip card module is inserted and/or areas which are reserved for embossing according to the ISO/IEC 7811-1 Standard.

Booster antennas are available which are constructed in printed form. The design does not take into consideration the areas to be kept free and it is questionable how it can be transferred to other production methods, if at all.

It is possible to investigate the different effect of different production methods on the electrical characteristics of a booster antenna structure. In this context, electrical components of the booster antenna structure such as, for instance, capacitive and/or inductive structures and/or the additionally electrically conductive structure can be matched to the material and process characteristics of different production methods in the equivalent circuit diagram. By understanding the influence of various production methods on electrical characteristics of the booster antenna structure, prefabricated booster antenna structure templates (inlay structures) of various manufacturers can be utilized, on the one hand. On the other hand, the performance of the booster antenna structure according to various embodiments, and the yield in the production, can be optimized.

In the text which follows, specific design criteria are explained for various production methods. It is possible to define equivalent circuit diagram parameters for each equivalent circuit diagram of an electrical structure in the booster antenna circuit depending on the production technology used.

In a production method which is effected by laying at least one conductive conductor (wired technology), conductive structures of a wire can be arranged on a substrate surface or carrier layer surface, respectively, wherein normal conductive materials such as copper, silver, aluminum, gold can be used as conductors. In this production method, resistances, for instance the resistance of the additionally electrically conductive structure of the booster antenna according to various embodiments can be adjusted by a suitable choice of the material and the diameter of a conductor used for the wiring. Furthermore, the conductor track length can also be adapted by forming, for example, meander-shaped wiring passages. Inductive structures can be produced by means of conductor tracks extending adjacently to one another, wherein the value of the inductance can be adjusted via their distance from one another. Inductive structures can have, for example, turns, wherein the value of the inductance can be adjusted by means of their number and size of the area bordered by them. Capacitive structures can be produced by line capacitances, for example in finger form or in spiral form. Furthermore, a capacitive structure can result in conjunction with a meander shape of the additional electrically conductive element.

In a production of the booster antenna structure by means of an etching process or of an electroplating printing process in which the basic electrical structures are initially printed on and then formed by means of an electroplating process, the resistance, for instance the resistance of the additionally electrically conductive structure of the booster antenna structure according to various embodiments, can be adjusted by the thickness and width of the conductor track, that is to say its cross section, and by the material used. Similarly, meander-shaped structures can be formed for increasing the conductor track length and thus the resistance. Inductive structures can be produced by means of conductor tracks extending adjacently to one another, wherein the value of the inductance can be adjusted via their distance from one another. For example, inductive structures can have turns, wherein the value of the inductance can be adjusted by their number and the size of the area bordered by them. Capacitive structures can be provided by a plate capacitance. For this purpose, separately formed capacitor electrodes in the form of plates can be formed, for example, on the front and rear of the carrier substrate on which the booster antenna is formed. Similarly, capacitive structures can be formed in the form of conductor tracks of the turns of the booster antenna arranged above one another on the front and rear of the carrier substrate. Furthermore, single-layer capacitive structures, that is to say formed only on one of the surfaces of the carrier substrate, can be provided, for example in finger form or in spiral form. A capacitive structure can also be formed in conjunction with a meander form of the additional electrically conductive element.

Figure 14:
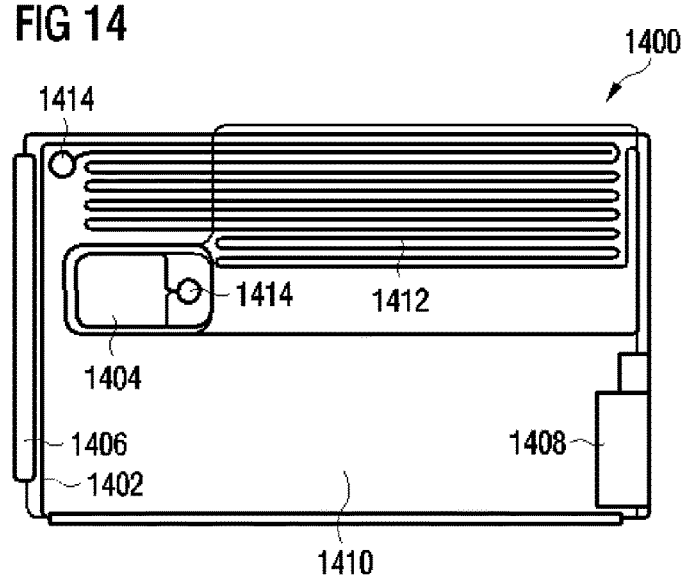
FIG. 14 shows an image of a booster antenna structure, produced by means of an electroplating process, according to various embodiments.

FIG. 14 shows an embodiment of a booster antenna structure 1400 according to various embodiments which can be produced by means of an electroplating printing process. The booster antenna structure 1400 can be arranged on a carrier substrate 1410 which can have, for example, PVC and is provided with conductive structures on both sides. The carrier substrate 1410 can have the size of a chip card in ID-1 format. One turn each of the booster antenna 1402 is arranged extending along the edge of the carrier substrate 1410 on the front and on the rear of the carrier substrate 1410. Apart from these main turns, the booster antenna 1402 additionally has smaller coupling turns which are also arranged on both sides of the carrier substrate 1410 and enclose the at least one inductive coupling area 1404. Furthermore, a first electrode of a first plate capacitor 1406 and a first electrode of a second plate capacitor 1408 is arranged on each surface of the carrier substrate 1410. A corresponding second electrode of the first plate capacitor 1406 and a corresponding second electrode of the second plate capacitor 1408 is arranged on the other side of the carrier substrate 1410—the carrier substrate 1410 acts here as a spacer between the two electrodes of the plate capacitors. If necessary, the carrier substrate 1410 can be thinned down at the locations of the plate capacitors if a distance is required between the capacitor plates of the first plate capacitor 1406 and/or the second plate capacitor 1408 which is smaller than the thickness of the carrier substrate 1410. Furthermore, an additional electrically conductive structure 1412 is arranged on the carrier substrate 1410 which is connected to the booster antenna structure 1400. The additional electrically conductive structure 1412 has a meander form wherein differently long meander areas can be contained within an additionally electrically conductive structure 1412. The electrical structures on both surfaces of the substrate 1410 are in electrical contact with one another by means of feed-throughs 1414.

Figure 15:
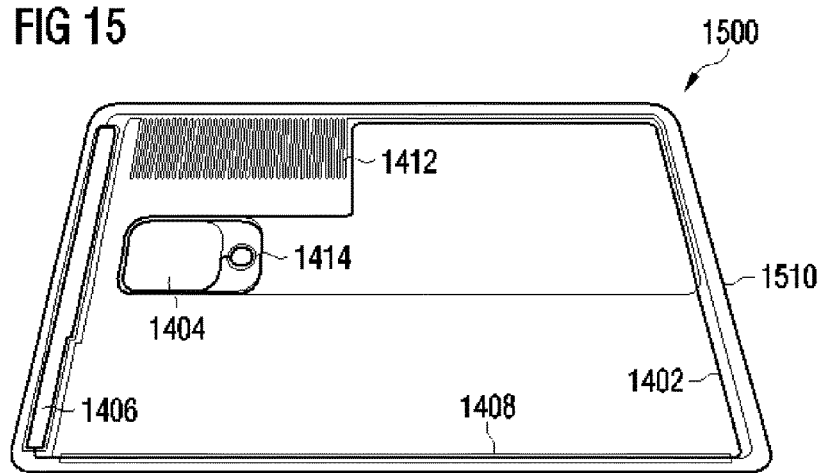
FIG. 15 shows an image of a booster antenna structure, produced by means of an etching process, according to various embodiments.

FIG. 15 shows an embodiment of a booster antenna structure 1500 according to various embodiments which may be produced by means of an etching process. The exemplary booster antenna structure 1500 shown in FIG. 15 is similar to the exemplary booster antenna structure 1400 shown in FIG. 14 so that corresponding structures carry the same reference symbols. Due to an etching process used for the production, however, the booster antenna structure 1500 has a more filigree design compared with the booster antenna structure 1400 which may be produced by means of electroplating printing processes.

A further possibility for producing a booster antenna structure according to various embodiments consists in using a printing process in which the basic electrical structures are completely printed on. The resistance, for instance the resistance of the additionally electrically conductive structure of the booster antenna according to various embodiments can be adjusted in this production process by the thickness and width of the conductor track, that is to say its cross section, and by the material used. Similarly, meander-shaped structures can be formed for increasing the conductor track length and thus the resistance. Furthermore, a separate resistance element may be provided by using a different material which can be used for printing at one location in the circuit of the booster antenna structure. Inductive structures may be produced by conductor tracks extending next to one another, wherein the value of the inductance may be adjusted by their distance from one another. Inductive structures can have turns, for example, wherein the value of the inductance can be adjusted by their number and the size of the area bordered by them. Capacitive structures can be provided by a plate capacitors. For this purpose, separately formed capacitor electrodes in the form of plates, for example, may be formed on the front and rear of the carrier substrate on which the booster antenna is formed. Similarly, capacitive structures in the form of conductor tracks of the turns of the booster antenna arranged above one another on the front and rear of the carrier substrate may be formed. Furthermore, single-layer capacitive structures, i.e. formed only on one of the surfaces of the carrier substrate, may also be provided, for example in the form of fingers or in spiral form. A capacitive structure can also be formed in conjunction with a meander-form of the additional electrically conductive element.

A booster antenna consists of a series resonant circuit comprising an inductor, a resistor, and a capacitor. This antenna can be realized utilizing several technologies such as printing, etching, etc. Wire embedding technology can be an effective solution for manufacturing booster antennas. A significant advantage is that the technology does not need a single via, soldering pad, or any other connection. The device illustrated, for example, in FIGS. 14 and 15 a single wire may simply arranged to generate a coil and a serial capacitor. If needed, additional meander structures (1412) may be used to generate a serial resistor or other electrically conductive structure. FIG. 16A discloses an exemplary serial concept 1610 and equivalent circuit 1620.

More particularly, FIG. 16A shows an equivalent circuit diagram illustrating a booster antenna 1620 is a simple series resonant circuit 1622. Said simple series resonant circuit includes an inductance 1624 typically in the form of a large conductor loop ($Ls_1$), a capacitance 1626 (Cs), an ohmic resistance 1628 (Rs), and an inductance 1632 of the small conductor loop ($Ls_2$). A first inductive coupling (with corresponding coupling factor $k_1$) read device (reader 1630) takes place via the inductance 1624 of the large conductor loop ($Ls_1$); a second inductive coupling ($k_2$) to contactless smart card module arrangement (HF tag) 1640, for example an on-chip antenna or a chip on module, takes place via the inductance 1632 of the small conductor loop ($Ls_2$).

An alternative matching concept may beneficial for the booster antenna's performance. Such concept, which may described as a parallel booster concept relies on a coupling structure connected in parallel to a separated pick-up circuit. FIG. 16B illustrates a concept 1650 and an equivalent circuit 1660 thereof. The equivalent circuit diagram 1660 shows first inductor/inductance (Ls) 1662, first capacitor/capacitance (Cs) 1664, first ohmic resistance/resistor (Rs) 1666 for a first electrical circuit 1665, which may correspond to the larger of two conductor loops, and second inductor/inductance (Lp) 1668, second capacitor/capacitance (Cp) 1670, and second ohmic resistance/resistor (Rp) 1669 for a second electrical circuit 1667, which may correspond to the smaller of two conductor loops.

As can be seen from the simplified equivalent circuit diagram 1660, the components in the first electrical circuit are shown in the form an exemplary series resonant circuit, and the components in the second electrical circuit are shown in the form of an exemplary series resonant circuit connected in parallel across second capacitor 1670. This may also be described in that series resonant circuit 1665 is in this case connected in series with the capacitance of a parallel resonant circuit 1667. First inductive coupling ($k_1$) to write and/or read device (reader) 1630 is performed via first inductance 1662 of first electrical circuit 1665. Coupling to HF tag 1640 is performed via second inductance 1668 of the second electrical circuit 1667.

Figure 17A:
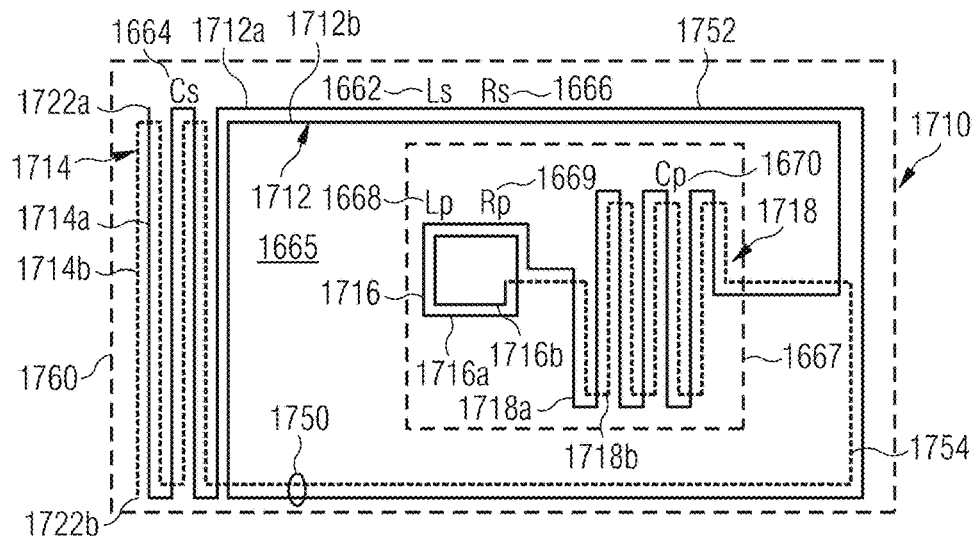
FIG. 17A-C show a wiring layout of various embodiments of the present disclosure.

A booster antenna structure for a chip card according to an embodiment is illustrated in FIG. 17. More particularly, booster antenna structure 1710 is illustrated in FIG. 17A, including a first electrical circuit 1665, which forms a first resonant circuit; and a second electrical circuit 1667, which forms a second resonant circuit. A parallel coupling (Cp) 1670, is shown between first electrical circuit 1665 and second electrical circuit 1667. The structure is formed from a single continuous wire 1750 shown in two portions, lead 1752 and return 1754.

As discussed above, this single conductor or wire may advantageously be fabricated on a substrate using wire embedding technology. A continuously embedded wire may have the advantage of improved production efficiency. As disclosed hereinbelow, the inherent characteristics of the wire or conductor used may be exploited for purposes of providing structures having specific electrical characteristics.

The booster antenna structure 1710 is shown having a first electrical circuit 1665 in the form a first series circuit. The first series circuit may include first inductor Ls, illustrated as a first wire loop structure/coil 1712 having an inductance 1662, for example dependent upon the number of windings 1712a, 1712b ... 1712(n) of single wire 1750 provided on substrate 1760. In the exemplary embodiment shown, first coil 1712 is arranged around the periphery of substrate 1760. Alternate configurations deviating from this configuration are of course possible, provided the desired inductive characteristics are achieved.

Additionally, first series circuit 1665 further comprises a first capacitor Cs, illustrated as overlapping meander structure 1714, having a capacitance 1664. First series circuit 1665 is shown further including a first ohmic resistance 1666. The ohmic resistance may be formed separately, or, as shown, may be a feature of the first inductor. I.e., the inherent ohmic resistance of windings 1712 may serve as a resistor structure in addition to its inductive function.

Second electrical circuit 1667 of booster antenna structure 1710 may also be configured as a series circuit. In particular, such a circuit may include and are shown having second inductance Lp, illustrated as a second wire loop structure/coil 1716 having an inductance 1668, for example dependent upon the number of windings 1716a, 1716b ... 1716(n) of single wire 1750 provided, for example, on substrate 1760. In the exemplary embodiment shown, second coil 1716 is arranged within the area circumscribed by first coil 1712. Alternate configurations deviating from this configuration are of course possible, provided the desired inductive characteristics are achieved.

Second circuit 1667 is shown including second capacitor Cp illustrated as overlapping meander structure 1718, having a capacitance 1670. Second series circuit 1667 is shown further including a second ohmic resistance 1669. The ohmic resistance may be formed separately, or as shown may be a feature of the second inductor. I.e. the inherent ohmic resistance of windings 1716 may serve as a resistor structure in addition to its inductive function.

First series circuit 1665 and second series circuit 1667 are coupled to each other in parallel via parallel coupling provided by or across second capacitance 1670.

Substrate 1760 may be formed of a flexible material. Single wire 1750 may be arranged directly on the carrier substrate 1760.

In operation, the booster antenna structure employs an inductive coupling structure in the second electrical circuit, for example to enable it to be inductively coupled to an HF tag (1640) or similar device.

As shown, and due at least in part to the parallel coupling arrangement of the first and second electrical circuit to each other. More particularly, in the exemplary configuration shown in FIG. 16B, first electrical circuit 1665 may have a first phase resonance and second electrical circuit 1667 may have a second phase resonance. Again, due in part to the parallel structure of the circuit, these respective resonances may be configured to be different from one another. I.e. they may be controlled or tuned separately or individually.

Booster antenna structure 1710 may be formed of a single etched wire, or may alternately be formed of a single printed wire, or may be formed of a single embedded wire. These examples are of course not intended to be limiting, but are provided by way of example only. The structure formed thereby may be a complex antenna structure.

Advantageously, the single wire concept enables the disclosed structures, and/or diverse booster antenna arrangements that may include no via structures, no soldered (pad) connections or similar discontinuities requiring, among others, extra materials, process steps, manufacturing/testing time.

Booster antenna structure 1710, as discussed herein, is formed of a single wire. This wire may be described as having a first ending and a second ending, wherein these endings are found within the structure and may be advantageously used in the formation thereof. For example first ending 1722a may form the terminal end of a first meander structure (1714a), and second ending 1722b may form the terminal end of a second meander structure (1714b).

Meander structures 1714a and 1714b may at least partially overlap. As shown in FIG. 17, the overlap is almost complete. Depending on the proximity of each portion of wire 1750 in first meander structure 1714a (in this case formed of lead portion 1752 of wire 1750) to corresponding portion of wire 1750 in second meander structure 1714b (in this case formed of return portion 1754 of wire 1750), the first capacitance 1664 may be formed across the first and second meander structures.

As stated above, first inductance 1662 may be formed by a first coil 1712 comprising at least one winding 1712a/1712b of said single wire and first ohmic resistance 1666 may at least partially be provided by said at least one winding of the first coil. In such a case, first coil 1712 is configured as a pickup coil. However, any inductive configuration may be contemplated.

Likewise, second inductance 1668 is formed by a second coil 1716 comprising at least one winding 1716a/1716b of said single wire, and the second ohmic resistance may at least partially be provided by said at least one winding of the second coil. As shown, the windings of the second coil may be smaller than said windings of the first coil, for example, the second coil may be nested within the first coil.

The single wire 1750 may form a third meander structure 1718a on the single wire portion (as shown lead portion 1752) between first coil 1712 and the second coil 1716. Single wire 1750 forms a fourth meander structure 1718b on the single wire portion (as shown return portion 1754) between the first coil and the second coil.

As discussed in connection with the first and second meander structures above, third meander 1718a and fourth meander 1718b at least partially overlap. As shown in FIG. 17, the overlap is nearly complete. Also as discussed in connection with the first and second meander structures above, depending on the proximity of each portion of wire 1750 in the third and fourth meander structures respectively, meander structure 1718a (in this case formed of lead portion 1752 of wire 1750) to corresponding portion of wire 1750 in second meander structure 1718b (in this case formed of return portion 1754 of wire 1750), the second capacitance (Cp) 1670 may be formed across the third and fourth meander structures.

The two capacitors thereby may be formed without any discontinuity in wire 1750. Moreover, each capacitor may be sized individually depending, for example, on the desired resonance frequency.

Figure 17B:
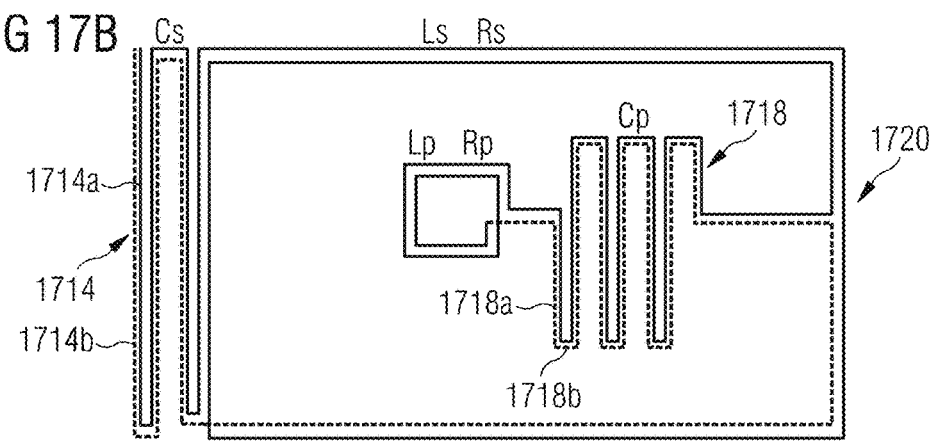
Figure 17C:
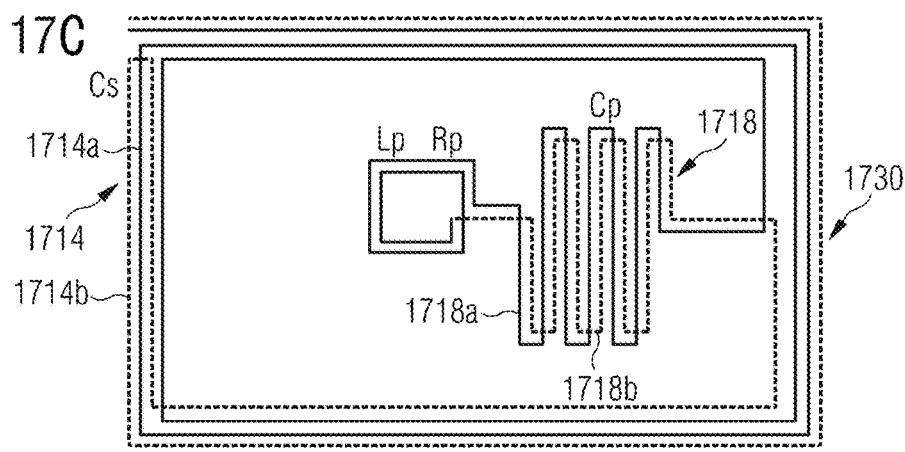

Additional designs may be implemented, for example structures 1720 and 1730 in FIGS. 17B and 17C, respectively provide a booster antenna structure wherein the third meander and the fourth meander overlap in a region without a wire crossing.

In an Example 1 according to embodiment of the disclosure a booster antenna structure for a chip card is disclosed wherein the booster antenna structure comprises: a first electrical circuit, which forms a first resonant circuit; and a second electrical circuit which forms a second resonant circuit; and a parallel coupling between the first electrical circuit and the second electrical circuit; wherein the booster antenna structure is formed of a single wire.

In Example 2, the subject matter of Example 1 can optionally include wherein the first electrical circuit comprises a first series circuit.

In Example 3, the subject matter of Example 2 can optionally include wherein the first series circuit further comprises a first inductance.

In Example 4, the subject matter of any one of Examples 2 to 3 can optionally include wherein the first series circuit further comprises a first capacitance.

In Example 5, the subject matter of any one of Examples 2 to 4 can optionally include wherein the first series circuit further comprises a first ohmic resistance.

In Example 6, the subject matter of any one of Examples 1 to 5 can optionally include wherein the second electrical circuit comprises a second series circuit.

In Example 7, the subject matter of Example 6 can optionally include wherein the second series circuit further comprises a second inductance.

In Example 8, the subject matter of any one of Examples 6 to 7 can optionally include wherein the second series circuit further comprises a second capacitance.

In Example 9, the subject matter of any one of Examples 6 to 8 can optionally include wherein the second series circuit further comprises a second ohmic resistance.

In Example 10, the subject matter of any one of Examples 8 to 9 can optionally include wherein said parallel coupling is provided across the second capacitance.

In Example 11, the subject matter of any one of Examples 9 to 10 can optionally include wherein the first ohmic resistance is provided by the ohmic resistance of the first inductance.

In Example 12, the subject matter of Example 11 can optionally include wherein the second ohmic resistance is provided by the ohmic resistance of the second inductance.

In Example 13, the subject matter of any one of Examples 1 to 12 can optionally include wherein the single wire is arranged on the flexible carrier.

In Example 14, the subject matter of any one of Examples 1 to 13 can optionally include wherein the second electrical circuit has an inductive coupling structure.

In Example 15, the subject matter of any one of Examples 1 to 14 can optionally include wherein the first electrical circuit has a first phase resonance and the second electrical circuit has a second phase resonance.

In Example 16, the subject matter of any one of Examples 1 to 15 can optionally include wherein said single wire is an etched wire.

In Example 17, the subject matter of any one of Examples 1 to 15 can optionally include wherein said single wire is a printed wire.

In Example 18, the subject matter of any one of Examples 1 to 15 can optionally include wherein said single wire is an embedded wire.

In Example 19, the subject matter of any one of Examples 1 to 18 can optionally include wherein the booster antenna structure is a complex antenna structure.

In Example 20, the subject matter of any one of Examples 1 to 19 can optionally include wherein said single wire includes no via structures.

In Example 21, the subject matter of any one of Examples 1 to 20 can optionally include wherein said single wire includes no soldered (pad) connection.

In Example 22, the subject matter of any one of Examples 4 to 21 can optionally include wherein said single wire has a first ending and a second ending.

In Example 23, the subject matter of Example 22 can optionally include wherein the first ending forms a first meander structure.

In Example 24, the subject matter of Example 23 can optionally include wherein the second ending forms a second meander structure.

In Example 25, the subject matter of Example 24 can optionally include wherein the first meander structure and the second meander structure at least partially overlap.

In Example 26, the subject matter of any one of Examples 24 to 25 can optionally include wherein the first capacitance is formed across the first and second meander structures.

In Example 27, the subject matter of any one of Examples 9 to 26 can optionally include wherein the first inductance is formed by a first coil comprising at least one winding of said single wire.

In Example 28, the subject matter of Example 27 can optionally include wherein the first ohmic resistance is at least partially provided by said at least one winding of the first coil.

In Example 29, the subject matter of any one of Examples 27 to 28 can optionally include wherein the first coil is a pickup coil.

In Example 30, the subject matter of any one of Examples 27 to 29 can optionally include wherein the second inductance is formed by a second coil comprising at least one winding of said single wire.

In Example 31, the subject matter of Example 30 can optionally include wherein the second ohmic resistance is at least partially provided by said at least one winding of the second coil.

In Example 32, the subject matter of any one of Examples 30 to 31 can optionally include wherein said windings of the second coil are smaller than said windings of the first coil.

In Example 33, the subject matter of Example 32 can optionally include wherein the second coil is nested within the first coil.

In Example 34, the subject matter of any one of Examples 30 to 33 can optionally include wherein the single wire forms a third meander structure between the first coil and the second coil.

In Example 35, the subject matter of Example 34 can optionally include wherein the single wire forms a fourth meander structure between the first coil and the second coil.

In Example 36, the subject matter of Example 35 can optionally include wherein the third meander and the fourth meander at least partially overlap.

In Example 37, the subject matter of Example 36 can optionally include wherein the third meander and the fourth meander overlap in a region without a wire crossing.

In Example 38, the subject matter of any one of Example 35 to 36 can optionally include wherein the second capacitance is formed across the third and fourth meander structures.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A booster antenna structure for a chip card, wherein the booster antenna structure comprises:
    a first electrical circuit comprising a first meander structure and a second meander structure, which forms a first resonant circuit; and
    a second electrical circuit comprising one or more meander structures which forms a second resonant circuit; and
    a parallel coupling between the first electrical circuit and the second electrical circuit;
    wherein a single wire comprises a first ending and a second ending and where the single wire comprises all of the meander structures of the first electrical circuit and the second electrical circuit; wherein the first ending forms a terminal end of the first meander structure, and wherein the second ending forms a terminal end of the second meander structure; and
    wherein the second electrical circuit is arranged within the first electrical circuit.

2. The booster antenna structure of claim 1,
    wherein the first electrical circuit comprises a first series circuit;
    wherein the first series circuit comprises a first inductance, a first capacitance and a first ohmic resistance;
    wherein the first ohmic resistance is provided by the ohmic resistance of the first inductance; and
    wherein the first electrical circuit has a first phase resonance.

3. The booster antenna structure of claim 2,
    wherein the second electrical circuit comprises a second series circuit;
    wherein the second series circuit comprises a second inductance, a second capacitance and a second ohmic resistance;
    wherein the second ohmic resistance is provided by the ohmic resistance of the second inductance; and
    wherein the second electrical circuit has a second phase resonance.

4. The booster antenna structure of claim 3 wherein said parallel coupling is provided across the second capacitance.

5. The booster antenna structure of claim 3 wherein the second electrical circuit has an inductive coupling structure.

6. The booster antenna structure of claim 3, wherein the first meander structure and the second meander structure at least partially overlap.

7. The booster antenna structure of claim 3, wherein the first capacitance is formed across the first and second meander structures.

8. The booster antenna structure of claim 3, wherein the first inductance is formed by a first coil comprising at least one winding of said single wire;
    wherein the first ohmic resistance is at least partially provided by said at least one winding of the first coil; and
    wherein the first coil is a pickup coil.

9. The booster antenna structure of claim 8,
    wherein the second inductance is formed by a second coil comprising at least one winding of said single wire;
    wherein the second ohmic resistance is at least partially provided by said at least one winding of the second coil; and
    wherein said windings of the second coil are smaller than said windings of the first coil.

10. The booster antenna structure of claim 9 wherein the second coil is nested within the first coil.

11. The booster antenna structure of claim 9 wherein the single wire forms a third meander structure between the first coil and the second coil.

12. The booster antenna structure of claim 11 wherein the single wire forms a fourth meander structure between the first coil and the second coil.

13. The booster antenna structure of claim 12 wherein the third meander and the fourth meander at least partially overlap.

14. The booster antenna structure of claim 12 wherein the third meander and the fourth meander overlap in a region without a wire crossing.

15. The booster antenna structure of claim 12 wherein the second capacitance is formed across the third and fourth meander structures.

16. The booster antenna structure of claim 1 further comprising a flexible carrier, wherein the single wire is arranged on the flexible carrier.

17. The booster antenna structure of claim 1 wherein said single wire is an etched wire, a printed wire or an embedded wire.

18. The booster antenna structure of claim 1 wherein the booster antenna structure is a complex antenna structure.

19. The booster antenna structure of claim 1 wherein said single wire includes no via structures or no soldered (pad) connection.

* * * * *